United States Patent
Wittek et al.

(10) Patent No.: US 8,906,261 B2
(45) Date of Patent: *Dec. 9, 2014

(54) LIQUID CRYSTAL MEDIUM CONTAINING THIOPHENE DERIVATIVES

(75) Inventors: Michael Wittek, Erzhausen (DE); Brigitte Schuler, Grossostheim (DE); Axel Jansen, Darmstadt (DE)

(73) Assignee: MERCK PATENT GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/812,743

(22) PCT Filed: Jul. 1, 2011

(86) PCT No.: PCT/EP2011/003271
§ 371 (c)(1),
(2), (4) Date: Jan. 28, 2013

(87) PCT Pub. No.: WO2012/013281
PCT Pub. Date: Feb. 2, 2012

(65) Prior Publication Data
US 2013/0119312 A1    May 16, 2013

(30) Foreign Application Priority Data
Jul. 29, 2010 (DE) .................. 10 2010 032 617

(51) Int. Cl.
| C09K 19/34 | (2006.01) |
| C09K 19/52 | (2006.01) |
| C09K 19/30 | (2006.01) |
| C09K 19/12 | (2006.01) |
| C09K 19/00 | (2006.01) |
| C09K 19/42 | (2006.01) |
| C09K 19/04 | (2006.01) |

(52) U.S. Cl.
CPC .......... *C09K 19/3491* (2013.01); *C09K 19/42* (2013.01); *C09K 2019/0466* (2013.01); *C09K 2019/122* (2013.01); *C09K 2019/3025* (2013.01); *C09K 2019/123* (2013.01)
USPC .......... 252/299.61; 252/299.01; 252/299.6; 252/299.63; 252/299.66; 428/1.1; 428/1.3

(58) Field of Classification Search
USPC .............. 252/299.01, 299.6, 299.61, 299.63, 252/299.66; 428/1.1, 1.3
See application file for complete search history.

(56) References Cited

U.S. PATENT DOCUMENTS

| 5,580,488 A | 12/1996 | Nakamura et al. |
| 8,394,293 B2 | 3/2013 | Jansen et al. |
| 8,486,297 B2 * | 7/2013 | Jansen et al. ............. 252/299.61 |
| 2011/0049427 A1 | 3/2011 | Jansen et al. |
| 2012/0001123 A1 | 1/2012 | Jansen et al. |

FOREIGN PATENT DOCUMENTS

| DE | 102009015554 A1 | 10/2009 |
| EP | 0467260 A2 | 1/1992 |
| JP | 2007084487 A | 4/2007 |
| WO | 2010099853 A1 | 9/2010 |

OTHER PUBLICATIONS

International Search Report from PCT/EP2011/003271 dated Oct. 25, 2011.
IPRP and Written Opinion from PCT/EP2011/003271 dated Jan. 29, 2013.
English Translation Abstract of JP2007084487A dated Apr. 5, 2007.
Robert McDonald, et al. "Synthesis and evaluation of some novel chiral heterocyclic liquid crystalline materials exhibiting ferro- and antiferro-electric phases" Liquid Crystals, vol. 32, No. 3, Mar. 2005, pp. 319-330.
Kevin Pantalone, et al. "New bent core mesogens with exceptionally high clearing points" Liquid Crystals, vol. 29, No. 7, 2002, pp. 945-950.
Alexander J. Seed, et al. "Novel, highly polarizable thiophene derivatives for use in nonlinear optical applications" Liquid Crystals, vol. 30, No. 9, Sep. 2003, pp. 1089-1107.

* cited by examiner

*Primary Examiner* — Geraldina Visconti
(74) *Attorney, Agent, or Firm* — Millen, White, Zelano & Branigan, P.C.

(57) ABSTRACT

The present invention relates to liquid-crystalline media (LC media) comprising thiophene derivatives and to liquid-crystal displays (LC displays) containing these LC media. The media have high optical anisotropy and preferably have a content of thiophene derivatives of 25% by weight or more.

16 Claims, No Drawings

LIQUID CRYSTAL MEDIUM CONTAINING THIOPHENE DERIVATIVES

The present invention relates to liquid-crystalline media (LC media) comprising thiophene derivatives and to liquid-crystal displays (LC displays) containing these LC media. The media have high optical anisotropy and preferably have a content of thiophene derivatives of 25% by weight or more.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The commonest display devices are based on the Schadt-Helfrich effect and have a twisted nematic structure. In addition, there are also cells which work with an electric field parallel to the substrate and liquid-crystal plane, such as, for example, IPS (in-plane switching) cells. In particular, TN, STN and IPS cells, especially TN, STN and IPS cells, are currently commercially interesting areas of application for the media according to the invention.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic mesophase for the above-mentioned cells, at the usual operating temperatures, i.e. in the broadest possible range above and below room temperature. Since liquid crystals are generally used as mixtures of a plurality of components, it is important that the components are readily miscible with one another. The individual compounds should have high solubility in a typical mixture, also called the host. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Examples of non-linear elements which can be used to individually switch the individual pixels are active elements (i.e. transistors). The term "active matrix" is then used, where a distinction can be made between two types:
1. MOS (metal oxide semiconductor) or other diodes on silicon wafers as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are backlit.

The term MLC displays here encompasses any matrix display with integrated non-linear elements, i.e., besides the active matrix, also displays with passive elements, such as varistors or diodes (MIM=metal-insulatormetal).

MLC displays of this type are particularly suitable for TV applications (for example pocket televisions) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff, Paris; STROMER, M., Proc. Eurodisplay 84, September 1984: Design of Thin Film Transistors for Matrix Addressing of Television Liquid Crystal Displays, pp. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable lifetimes. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not satisfy today's requirements.

For TV and video applications, MLC displays having short response times are required. Such short response times can be achieved, in particular, if liquid-crystal media having low values for the viscosity, in particular the rotational viscosity $\gamma_1$, are used. However, diluting additives generally lower the clearing point and thus reduce the working-temperature range of the medium.

Thus, there continues to be a great demand for MLC displays having very high specific resistance at the same time as a large working-temperature range, short response times, even at low temperatures, and a low threshold voltage which do not exhibit these disadvantages or only do so to a lesser extent.

In the case of TN (Schadt-Helfrich) cells, media are desired which facilitate the following advantages in the cells:
    extended nematic phase range (in particular down to low temperatures)

ability to switch at extremely low temperatures (outdoor use, automobiles, avionics)
increased resistance to UV radiation (longer life)
low threshold voltage.

The media available from the prior art do not enable these advantages to be achieved while simultaneously retaining the other parameters.

In the case of supertwisted (STN) cells, media are desired which facilitate greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

In the case of LC displays for TV and video applications (for example LCD TVs, monitors, PDAs, notebooks, games consoles), a significant reduction in the response times is desired. There is therefore a demand for compounds for LC media which facilitate a reduction in the response times without simultaneously impairing the other properties of the LC medium, such as, for example, the clearing point, the dielectric anisotropy $\Delta\epsilon$ or the birefringence $\Delta n$. Low rotational viscosities, in particular, are desirable for this purpose.

In the case of applications of LC media having positive dielectric anisotropy, fast response times are generally demanded. It is known that a reduction in the layer thickness d of the LC medium in the LC cell theoretically results in a reduction in the response times. LC media having relatively high birefringence values $\Delta n$ are therefore required for this purpose in order to ensure an adequate optical retardation d·$\Delta n$. On the other hand, however, LC media having relatively high birefringence values typically also exhibit relatively high values of the rotational viscosity, which in turn results in longer response times. The shortening of the response time achieved by reducing the layer thickness is thus at least partly compensated again by the relatively high rotational viscosity of the LC medium used. There is therefore an urgent demand for LC media which simultaneously have high birefringence values and low rotational viscosities.

Besides these established display applications, which are based on various electro-optical effects, there are some electro-optical devices which operate with LC media. These include printers, scanners, lenses, exposure apparatuses and electro-optical shutters. The latter can be used in technical apparatuses or cameras, and recently also in displays for three-dimensional (3D) images. Such 3D display devices use fast-switching LC media as shutter in order to generate separate beams alternately for addressing the left and right eye of a viewer. The LC medium here can be accommodated, depending on the 3D technology, in spectacles or in a part of the screen. Very fast response times are necessary for such applications. High birefringence is likewise desirable in many cases in order, for example, to achieve controllable light diffraction for LC lenses. These switchable lenses can be employed in autostereoscopic displays consisting of a switchable 2D display and switchable optical elements which are able to change between a 2D mode and a 3D mode. The lenses, designed as switchable lenticular lenses, fan out the pixel contents of the 2D display into the room. Each fan element contains the information of a 3D content from a certain viewing angle. If the two eyes of a viewer are located in adjacent fans, the viewer perceives a spatial stereoscopic image.

The switchable lens here can be implemented as a liquid-crystal GRIN lens ('gradient index lens') or as a liquid-crystal replica lens. In order to achieve high lens power, high optical birefringence of the LC medium used is desirable.

The invention is based on the object of providing media, in particular for MLC, TN, STN or IPS displays of this type, which have the desired properties indicated above and do not exhibit the disadvantages indicated above or only do so to a lesser extent. In particular, the LC media should have fast response times and low rotational viscosities at the same time as high dielectric anisotropy and high birefringence. In addition, the LC media should have a high clearing point, a broad nematic phase range and a low threshold voltage.

It has now been found that this object can be achieved if high concentrations of certain thiophene derivatives are used in LC media, in particular in LC media having positive dielectric anisotropy, and in MLC, TN, STN and IPS displays. These thiophene derivatives result in LC media having the desired properties indicated above.

Numerous thiophene compounds have been described as liquid crystals. Compounds and mixtures are known, for example from the specification WO 2009/129915 A1. The proportion of thiophene compounds therein is 3 to 18% by weight.

The present invention thus relates to an LC medium comprising one or more compounds of the formula I

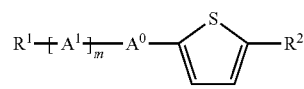

I in which the individual radicals have the following meanings:
$R^1$ and $R^2$ denote H, F, Cl, Br, —CN, —SCN, —NCS, $SF_5$ or straight-chain or branched alkyl having 1 to 12 C atoms, in which, in addition, one or more non-adjacent $CH_2$ groups may each be replaced, independently of one another, by —CH=CH—, —C≡C—, —O—, —CO—, —CO—O—, —O—CO—, —O—CO—O— in such a way that O atoms are not linked directly to one another, and in which, in addition, one or more H atoms may be replaced by F, Cl or Br,
$A^0$ denotes

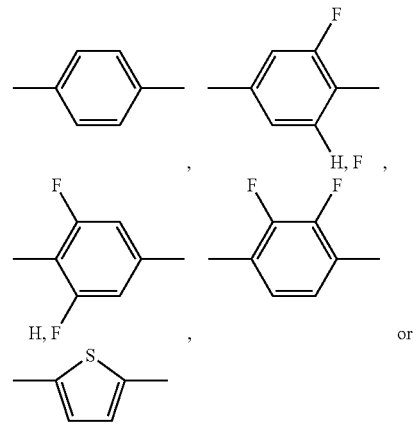

$A^1$, independently of one another, denotes phenylene-1,4-diyl, in which, in addition, one or two CH groups may be replaced by N and one or more H atoms may be replaced by halogen, CN, $CH_3$, $CHF_2$, $CH_2F$, $OCH_3$, $OCHF_2$ or $OCF_3$, cyclohexane-1,4-diyl, in which, in addition, one or two non-adjacent $CH_2$ groups may be replaced, independently of one another, by O and/or S and one or more H atoms may be replaced by F, cyclohexene-1,4-diyl, bicyclo[1.1.1]pentane-1,3-diyl, bicyclo-[2.2.2]octane-1,4-diyl, spiro[3.3]heptane-2,6-diyl, tetrahydropyran-2,5-diyl or 1,3-dioxane-2,5-diyl, m denotes 0, 1 or 2, preferably 1 or 2, particularly preferably 1.

The invention preferably relates to an LC medium which has at room temperature a nematic phase, preferably achiral, comprising one or more compounds of the formula I. The media have high optical anisotropy and preferably have a content of thiophene derivatives of 25% by weight or more.

The invention furthermore relates to the use of LC media according to the invention in electro-optical displays, in particular LC displays.

The invention furthermore relates to an LC display or an electro-optical device containing one or more compounds of the formula I (preferably 25% by weight or more) or an LC medium according to the invention. In particular, it is an MLC, TN, STN or IPS display or an electro-optical switchable lens or a shutter, preferably for an LC display, camera, printer or exposure apparatus.

LC media which have an achiral LC phase without the presence of chiral dopants, and compounds of the formula I in which the radicals $Z^{1,2}$, $A^{1,2}$, $R^{1,2}$ do not have a centre of chirality are generally preferred.

The medium preferably comprises 25-80% by weight, preferably 30% by weight or more, and particularly preferably 40% by weight or more, of compounds of the formula I.

Particular preference is given to LC media comprising compounds of the formula I in which $A^0$ denotes

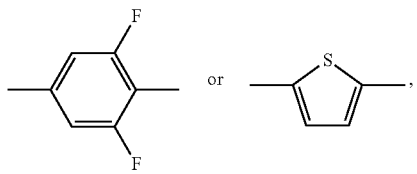

in particular

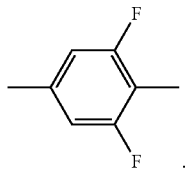

The rings $A^1$ in formula I particularly preferably denote phenylene-1,4-diyl, which may also be mono- or polysubstituted by F.

$A^1$ in formula I particularly preferably denotes a radical of the formula

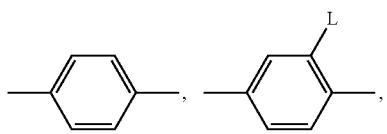

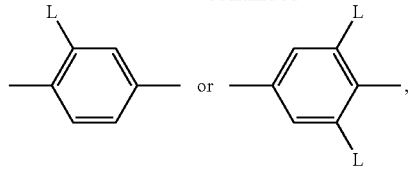

preferably unsubstituted 1,4-phenylene, in which L denotes halogen, preferably F.

Preference is furthermore given to compounds of the formula I in which $R^1$ and $R^2$ each, independently of one another, denote unbranched alkyl, alkenyl or alkynyl having 1 to 8, preferably 1 to 5, C atoms, each of which is optionally substituted by halogen, in particular by F.

$R^1$ is very particularly preferably equal to alkyl. Very particularly preferably, $R^1$ is alkyl and $R^2$ is H or alkyl. $R^1$, $R^2$ each, independently of one another, very particularly preferably denote unbranched alkyl having 1-5 C atoms. If $R^1$ and $R^2$ denote substituted alkyl, alkoxy, alkenyl or alkynyl, the total number of C atoms in the two groups $R^1$ and $R^2$ is preferably less than 10.

Preferred alkyl groups are, for example, methyl, ethyl, n-propyl, n-butyl, n-pentyl, n-hexyl, n-heptyl and n-octyl.

Preferred alkenyl groups are, for example, ethenyl, propenyl, butenyl and pentenyl.

Preferred alkynyl groups are, for example, ethynyl, propynyl, butynyl, pentynyl, hexynyl, heptynyl and octynyl.

Preferred alkoxy groups are, for example, methoxy, ethoxy, n-propoxy, n-butoxy, n-pentoxy, n-hexoxy, n-heptoxy, n-octoxy.

Halogen preferably denotes F or Cl.

Particularly preferred compounds of the formula I are those selected from the following sub-formulae:

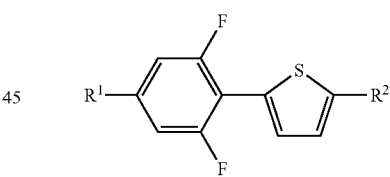

I1

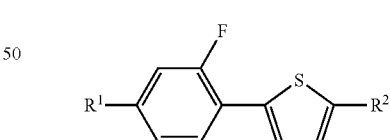

I2

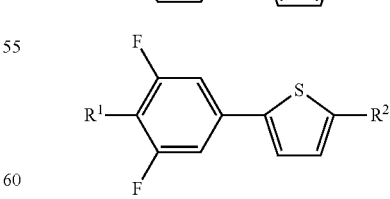

I3

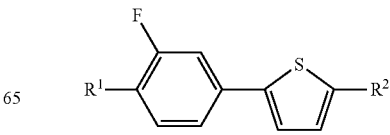

I4

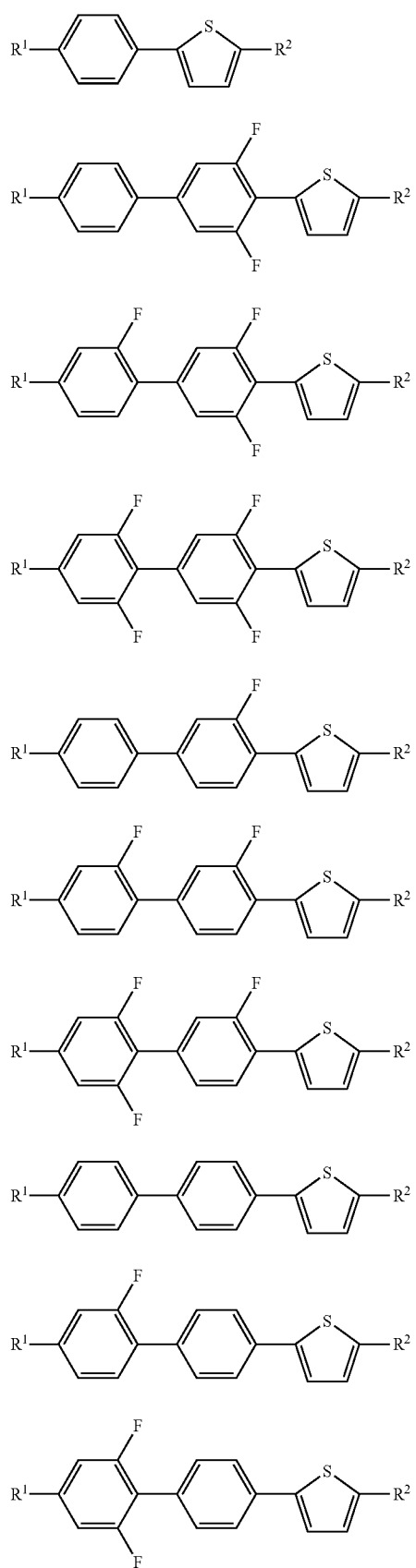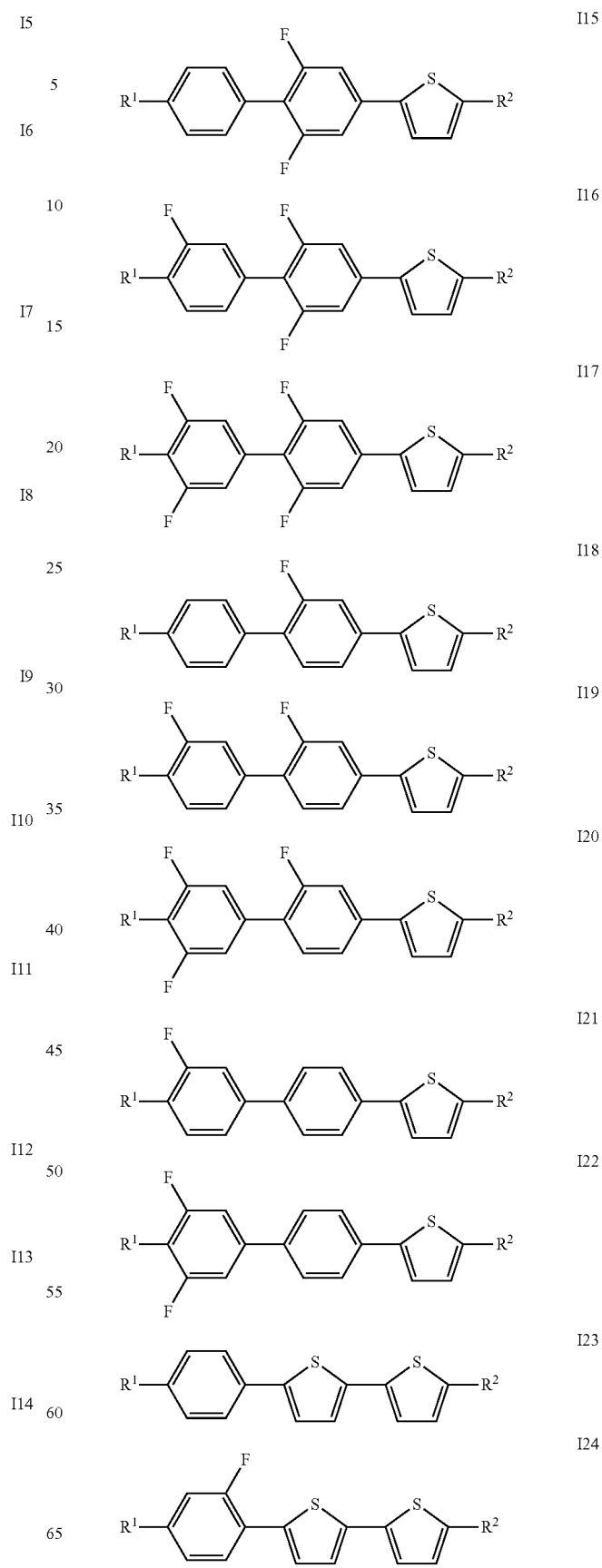

I25
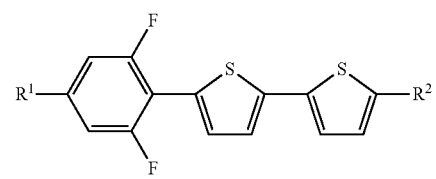
I26
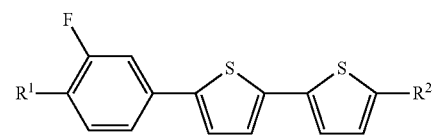
I27
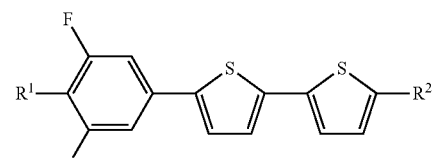
I28
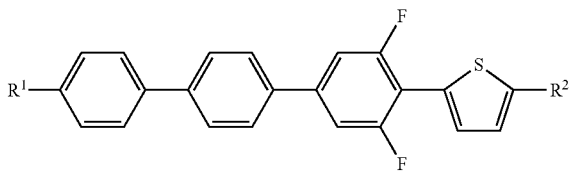
I29
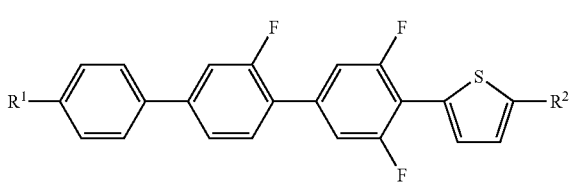
I30
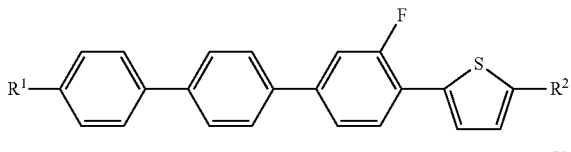
I31
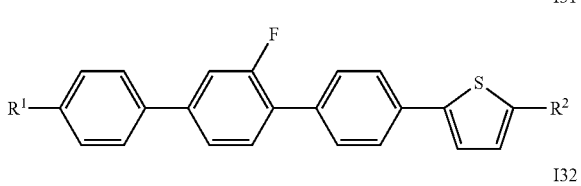
I32
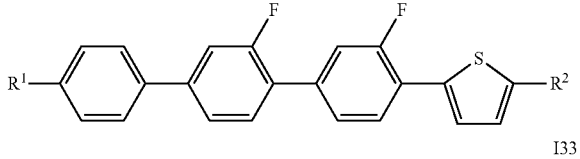
I33
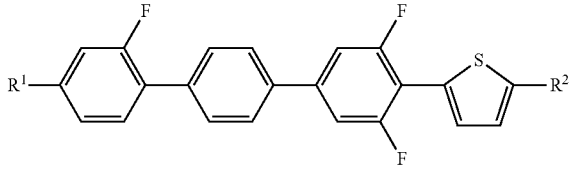
I34
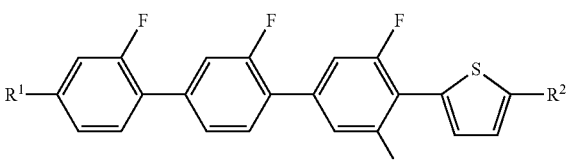
I35
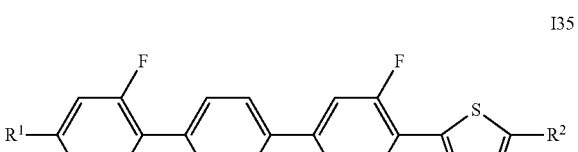
I36
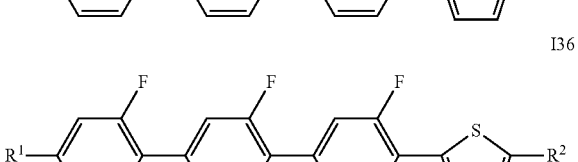
I37
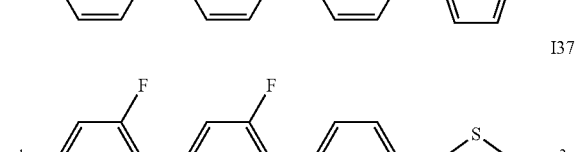
I38
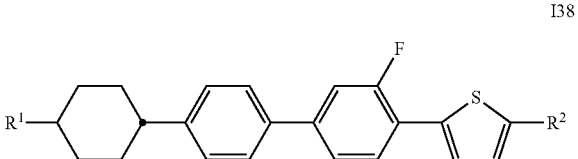
I39
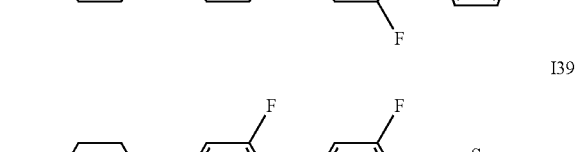
I40
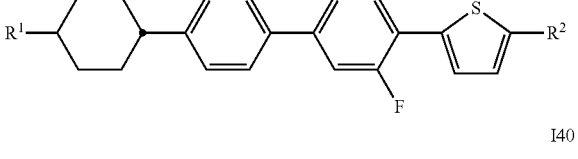
I41
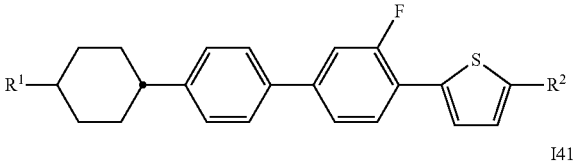
I42
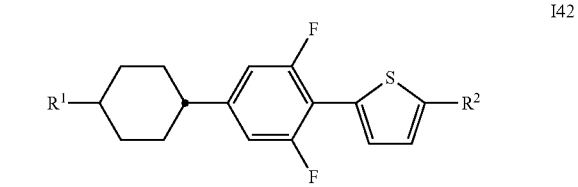

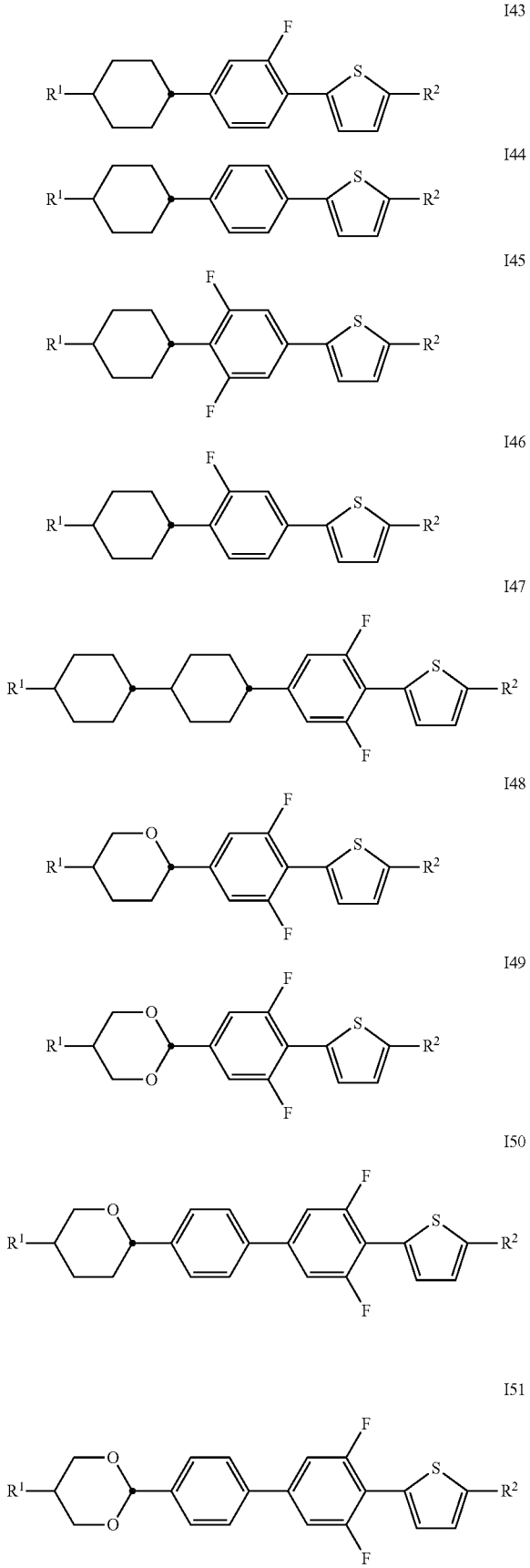

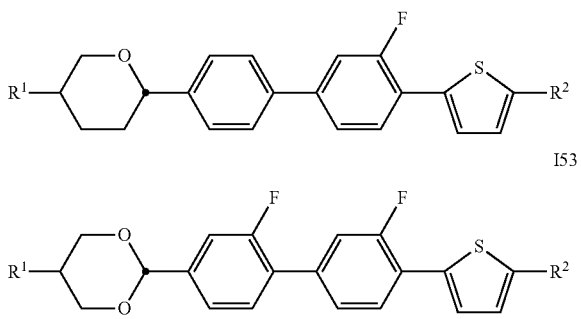

in which $R^1$ and $R^2$ have the meanings indicated above and below. $R^1$ and $R^2$ therein preferably denote optionally fluorinated alkyl, alkenyl, alkynyl or alkoxy having 1 to 12 C atoms, particularly preferably optionally fluorinated alkyl, alkenyl or alkynyl having 1 to 6 C atoms. The compounds of the formulae I1 to I37 are particularly preferred owing to the high dielectric anisotropy in relation to the viscosity, in particular compounds I1 to I27, and very particularly compounds of the formula I6.

The synthesis of suitable thiophenes of the formula I is known, for example from WO 2009/129915 A1 and the international applications PCT/EP2010/000636 and PCT/EP2010/000968. Further compounds of the formula I can be prepared analogously to processes which are known and/or described in standard works of organic chemistry, such as, for example, in Houben-Weyl, Methoden der organischen Chemie [Methods of Organic Chemistry], Thieme-Verlag, Stuttgart, and analogously to the example syntheses.

Particularly preferred LC media according to the invention are mentioned below:

LC medium which additionally comprises one or more compounds of the formulae II and/or III:

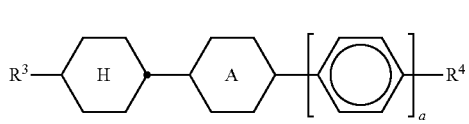

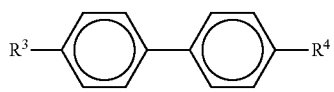

in which

A denotes 1,4-phenylene or trans-1,4-cyclohexylene, a is 0 or 1, $R^3$ denotes alkyl or alkenyl having 1 to 8 or 2 to 9 C atoms respectively, preferably alkenyl, and $R^4$ denotes alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, and preferably denotes alkyl having 1 to 12 C atoms or alkenyl having 2 to 9 C atoms.

The compounds of the formula II are preferably selected from the group consisting of the following formulae:

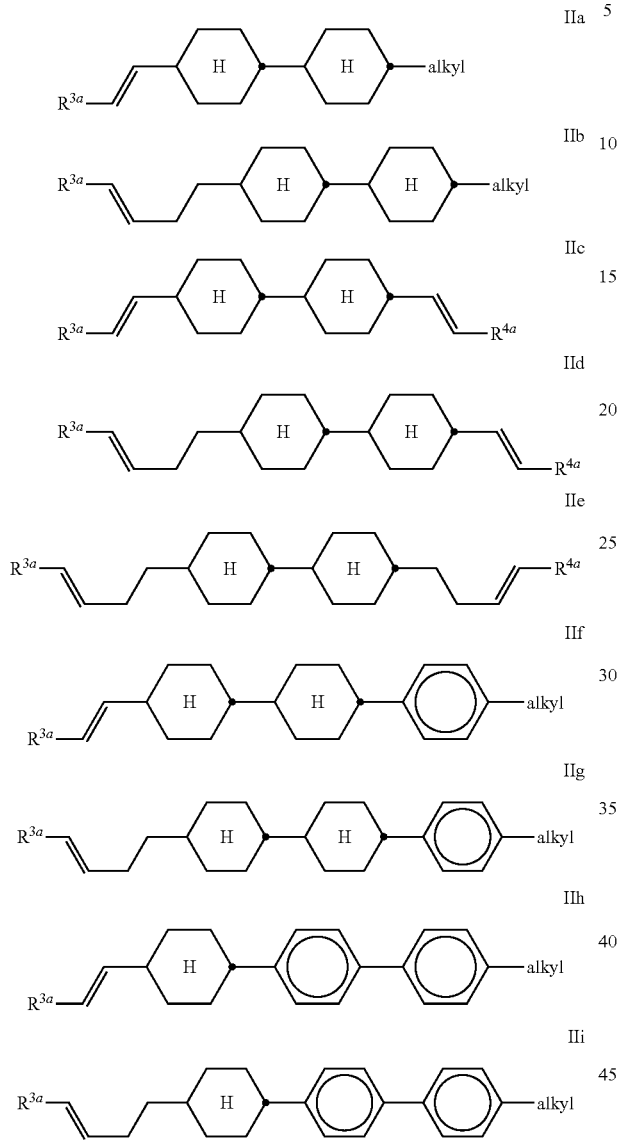

in which $R^{3a}$ and $R^{4a}$ each, independently of one another, denote H, $CH_3$, $C_2H_5$ or $C_3H_7$, and "alkyl" denotes a straight-chain alkyl group having 1 to 8, preferably 1, 2, 3, 4 or 5, C atoms. Particular preference is given to compounds of the formulae IIa and IIf, in particular in which $R^{3a}$ denotes H or $CH_3$, preferably H, and compounds of the formula IIc, in particular in which $R^{3a}$ and $R^{4a}$ denote H, $CH_3$ or $C_2H_5$.

The compounds of the formula III are preferably selected from the group consisting of the following formulae:

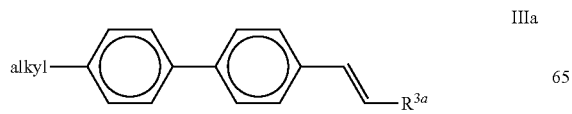

IIIa

-continued

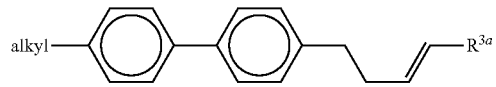

IIIb in which "alkyl" and $R^{3a}$ have the meanings indicated above, and $R^{3a}$ preferably denotes H or $CH_3$. Particular preference is given to compounds of the formula IIIb;

LC medium which additionally comprises one or more compounds selected from the group consisting of the following formulae:

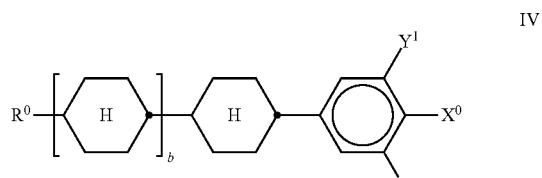

IV

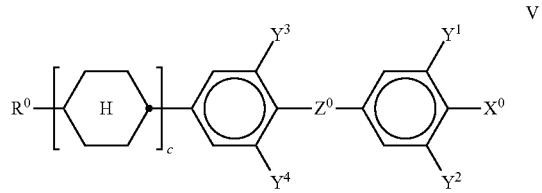

V

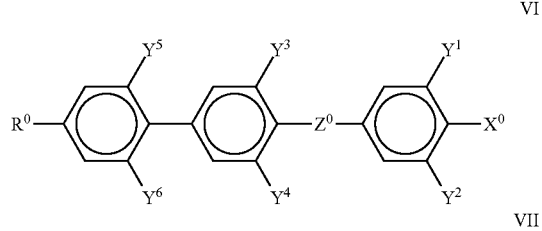

VI

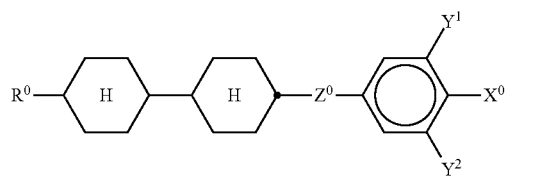

VII

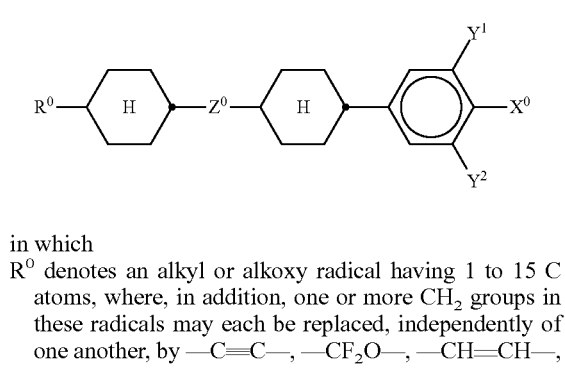

VIII in which
$R^0$ denotes an alkyl or alkoxy radical having 1 to 15 C atoms, where, in addition, one or more $CH_2$ groups in these radicals may each be replaced, independently of one another, by —C≡C—, —$CF_2O$—, —CH=CH—,

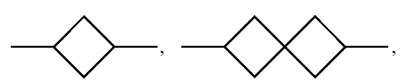

—O—, —CO—O— or —O—CO— in such a way that O atoms are not linked directly to one another, and in which, in addition, one or more H atoms may be replaced by halogen, $X^0$ denotes F, Cl, CN, $SF_5$, SCN, NCS, a halogenated alkyl radical, halogenated alkenyl radical, halogenated alkoxy radical or halogenated alkenyloxy radical, each having up to 6 C atoms, $Y^{1-6}$ each, independently of one another, denote H or F, $Z^0$ denotes —$C_2H_4$—, —$(CH_2)_4$—, —CH=CH—, —CF=CF—, —$C_2F_4$—, —$CH_2CF_2$—, —$CF_2CH_2$—, —$CH_2O$—, —$OCH_2$—, —COO—, —$CF_2O$— or —$OCF_2$—, in the formulae V and VI also a single bond, and b and c each, independently of one another, denote 0 or 1.

In the compounds of the formulae IV to VIII, $X^0$ preferably denotes F or $OCF_3$, furthermore $OCHF_2$, $CF_3$, $CF_2H$, Cl, OCH=$CF_2$. $R^0$ is preferably straight-chain alkyl or alkenyl, each having up to 6 C atoms.

The compounds of the formula IV are preferably selected from the group consisting of the following formulae:

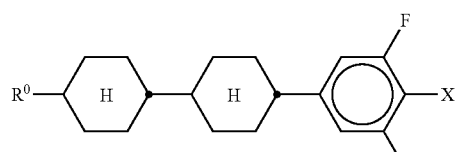

IVa

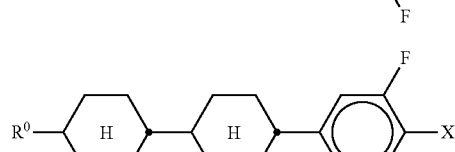

IVb

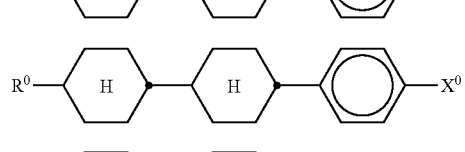

IVc

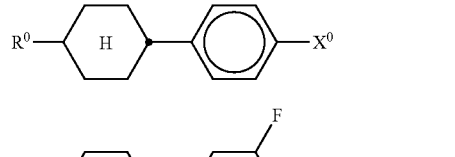

IVd

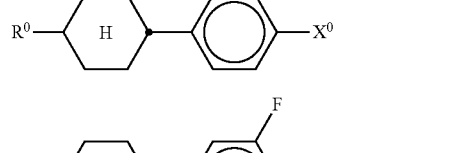

IVe

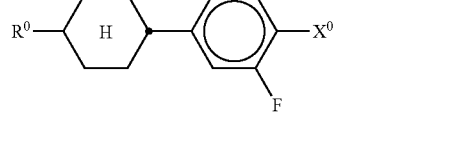

IVf in which $R^0$ and $X^0$ have the meanings indicated above.

Preferably, $R^0$ in formula IV denotes alkyl having 1 to 8 C atoms and $X^0$ denotes F, Cl, $OCHF_2$ or $OCF_3$, furthermore OCH=$CF_2$. In the compound of the formula IVb, $R^0$ preferably denotes alkyl or alkenyl. In the compound of the formula IVd, $X^0$ preferably denotes Cl, furthermore F.

The compounds of the formula V are preferably selected from the group consisting of the following formulae:

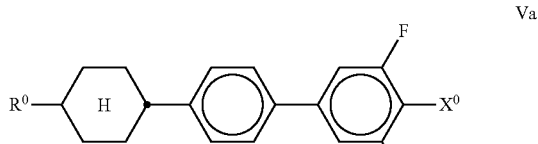

Va

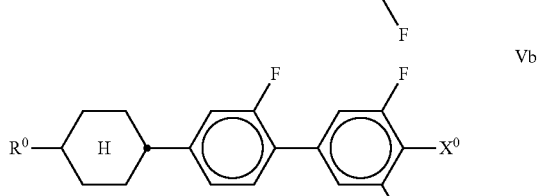

Vb

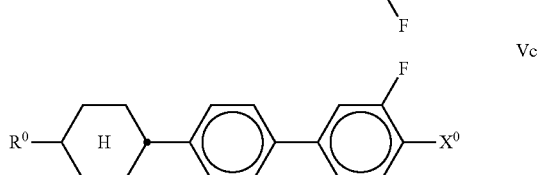

Vc

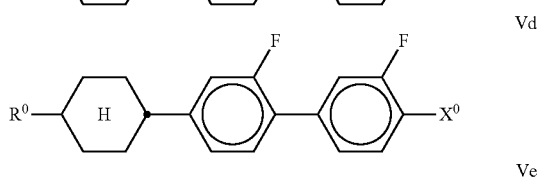

Vd

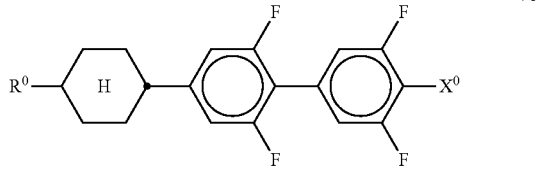

Ve

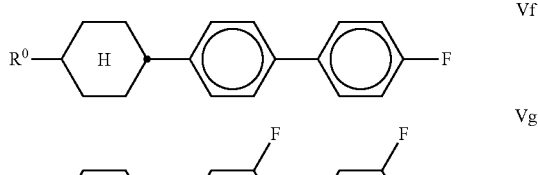

Vf

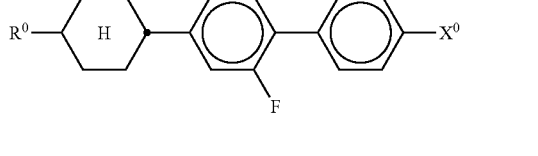

Vg in which $R^0$ and $X^0$ have the meanings indicated above. Preferably, $R^0$ in formula V denotes alkyl having 1 to 8 C atoms and $X^0$ denotes F;

LC medium which comprises one or more compounds of the formula VI-1.

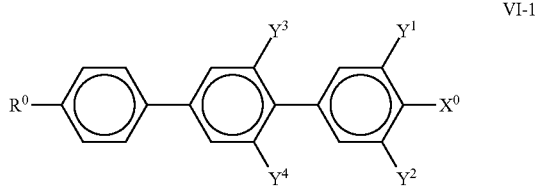

VI-1 in which $Y^1$ preferably denotes F, particularly preferably those selected from the group consisting of the following formulae:

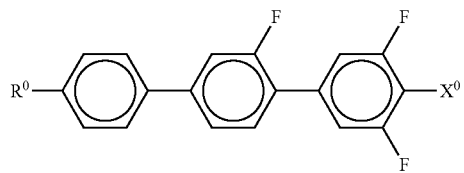
VI-1a

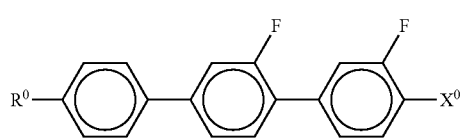
VI-1b

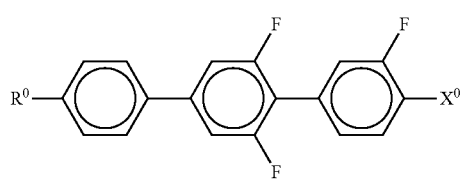
VI-1c

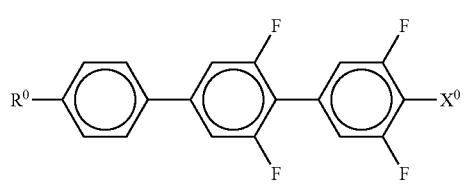
VI-1d in which R⁰ and X⁰ have the meanings indicated above. Preferably, R⁰ in formula VI denotes alkyl having 1 to 8 C atoms and X⁰ denotes F, furthermore OCF₃.

LC medium which comprises one or more compounds of the formula VI-2:

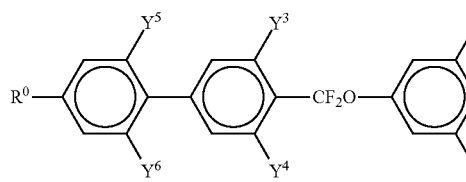
VI-2 particularly preferably those selected from the group consisting of the following formulae:

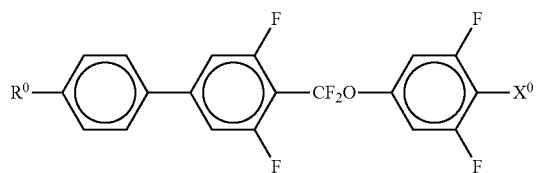
VI-2a

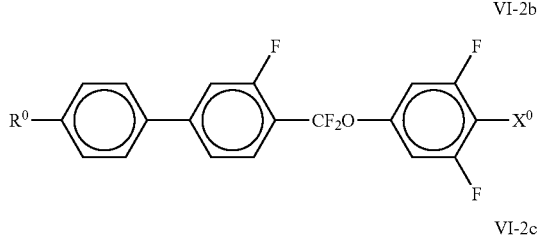
VI-2b

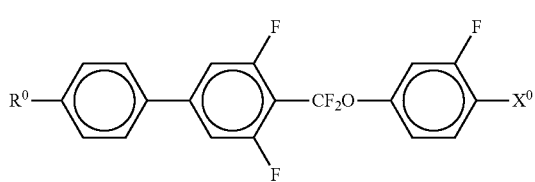
VI-2c

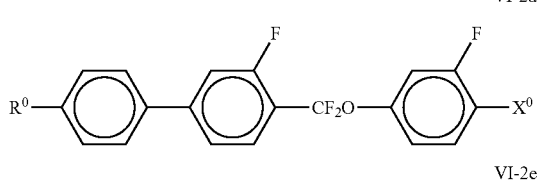
VI-2d

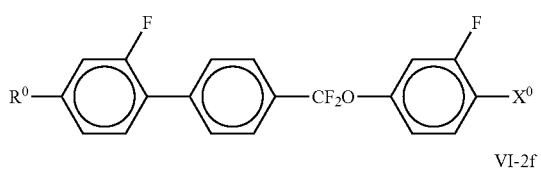
VI-2e

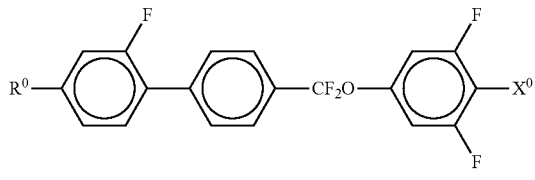
VI-2f in which R⁰ and X⁰ have the meanings indicated above.

Preferably, R⁰ in formula VI denotes alkyl having 1 to 8 C atoms and X⁰ denotes F;

LC medium which preferably comprises one or more compounds of the formula VII in which Z⁰ denotes —CF₂O—, —CH₂CH₂— or —COO—, particularly preferably those selected from the group consisting of the following formulae:

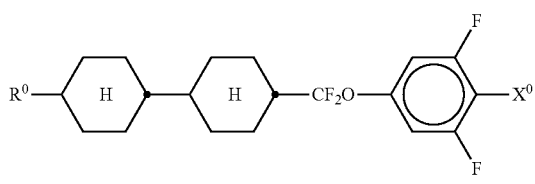
VII-1a

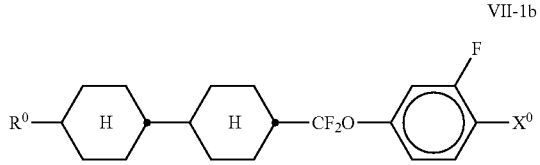
VII-1b

VII-1c

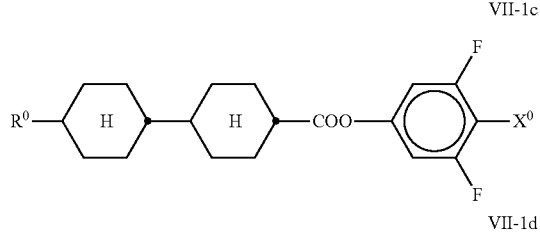

VII-1d

VII-1e in which R⁰ and X⁰ have the meanings indicated above. Preferably, R⁰ in formula VII denotes alkyl having 1 to 8 C atoms and X⁰ denotes F, furthermore OCF₃.

The compounds of the formula VIII are preferably selected from the group consisting of the following formulae:

VIIIa

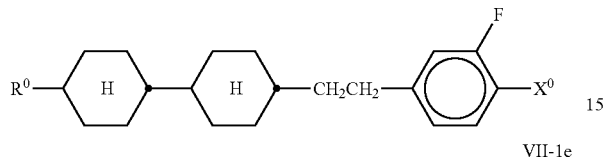

VIIIb

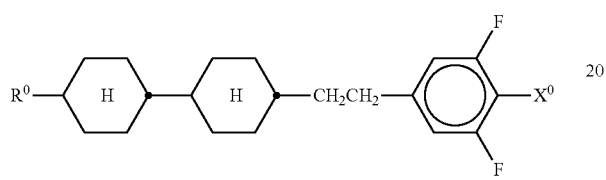

VIIIc

VIIId

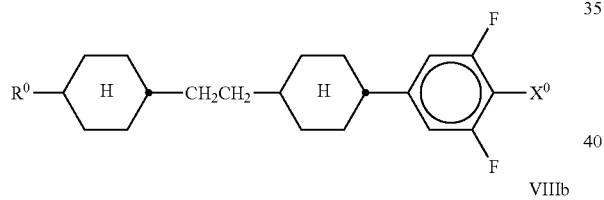

VIIIe

VIIIf

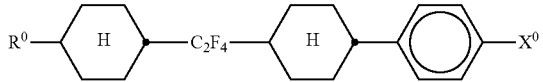

in which R⁰ and X⁰ have the meanings indicated above. R⁰ preferably denotes a straight-chain alkyl radical having 1 to 8 C atoms. X⁰ preferably denotes F.

LC medium which additionally comprises one or more compounds of the following formula:

IX

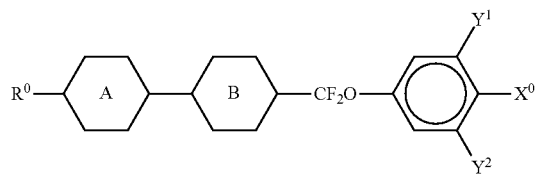

in which R⁰, X⁰, Y¹ and Y² have the meanings indicated above, and

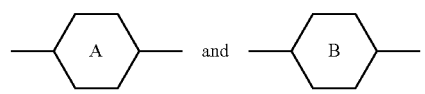

each, independently of one another, denote

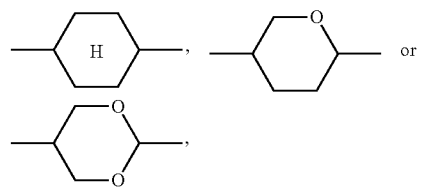

where the rings A and B do not both simultaneously denote cyclohexylene.

The compounds of the formula IX are preferably selected from the group consisting of the following formulae:

IXa

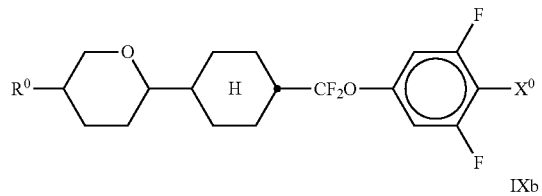

IXb

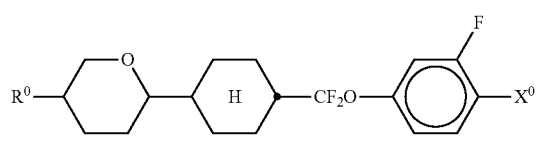

IXc
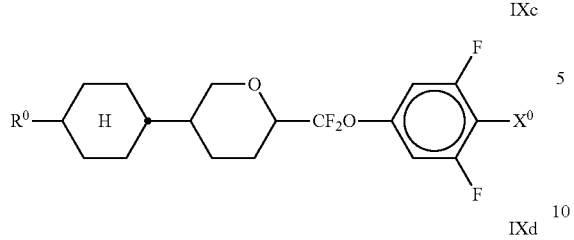
IXd

IXe
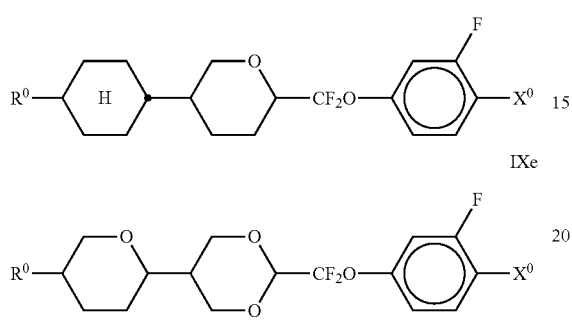
IXf

IXg
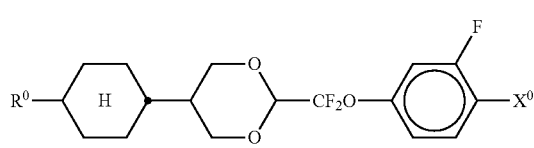
IXh in which $R^0$ and $X^0$ have the meanings indicated above. Preferably, $R^0$ denotes alkyl having 1 to 8 C atoms and $X^0$ denotes F. Particular preference is given to compounds of the formula IXa;

LC medium which additionally comprises one or more compounds selected from the group consisting of the following formulae:

X
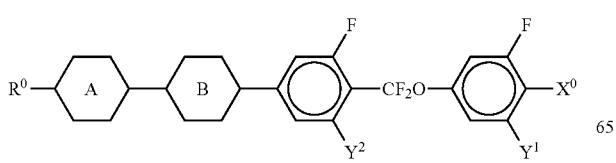

XI
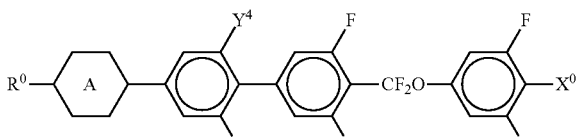

in which $R^0$, $X^0$ and $Y^{1-4}$ have the meanings indicated above, and

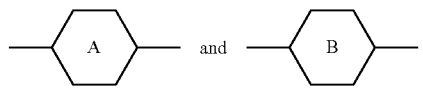

each, independently of one another, denote

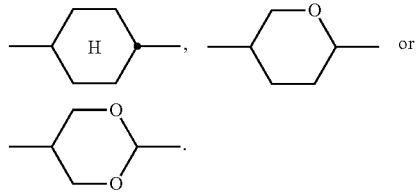

The compounds of the formulae X and XI are preferably selected from the group consisting of the following formulae:

Xa
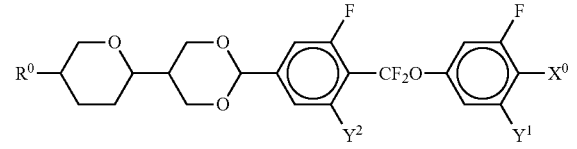

Xb
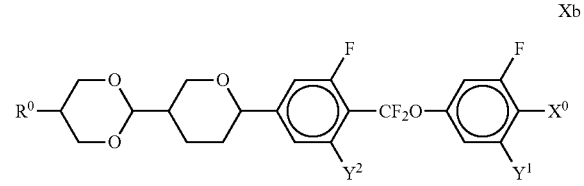

Xc
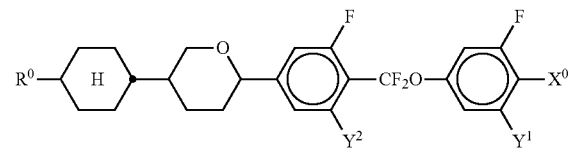

Xd
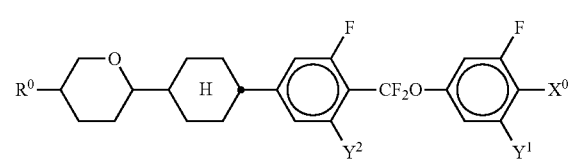

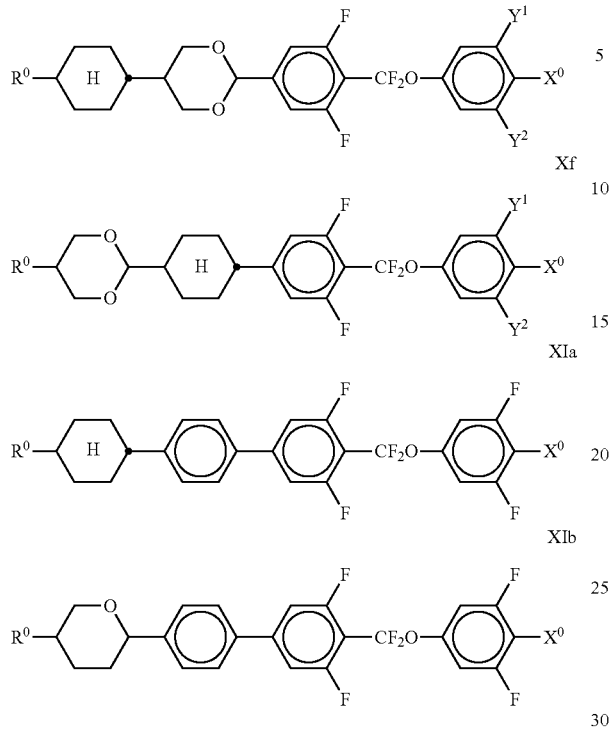

in which $R^0$ and $X^0$ have the meanings indicated above. Preferably, $R^0$ denotes alkyl having 1 to 8 C atoms and $X^0$ denotes F. Particularly preferred compounds are those in which $Y^1$ denotes F and $Y^2$ denotes H or F, preferably F;

LC medium which additionally comprises one or more compounds of the following formula:

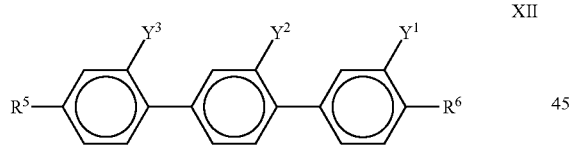

XII in which $R^5$ and $R^6$ each, independently of one another, denote n-alkyl, alkoxy, oxaalkyl, fluoroalkyl or alkenyl, each having up to 9 C atoms, and preferably each, independently of one another, denote alkyl having 1 to 8 C atoms. $Y^{1-3}$, independently of one another, denote H or F. Preferably, one or two of the groups from $Y^{1-3}$ denote(s) F.

Preferred compounds of the formula XII are those selected from the group consisting of the following formulae:

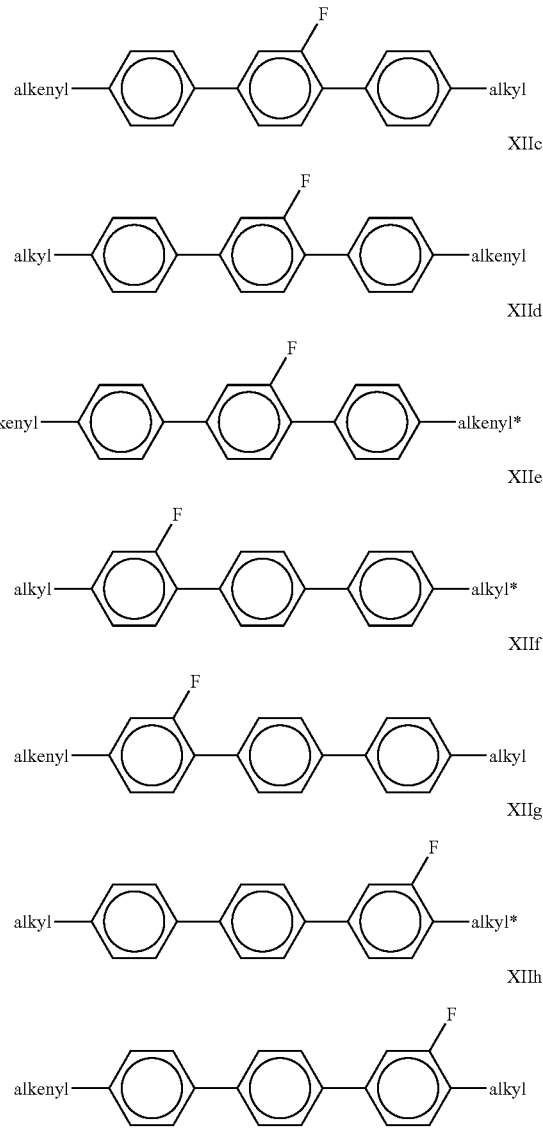

in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

Particular preference is given to the compounds of the formulae XXIIa to XIId. Very particular preference is given to compounds of the following formula:

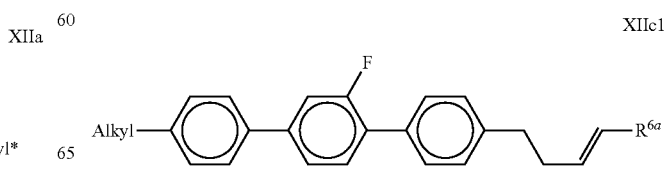

in which alkyl has the meaning indicated above, and $R^{6a}$ denotes H or $CH_3$.

LC medium which additionally comprises one or more compounds selected from the group consisting of the following formulae:

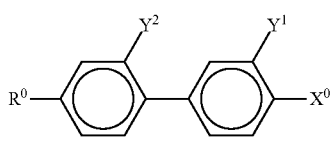

XIII

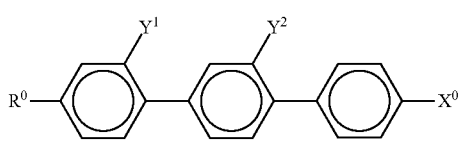

XIV

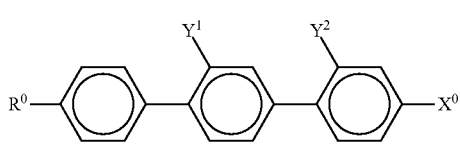

XV

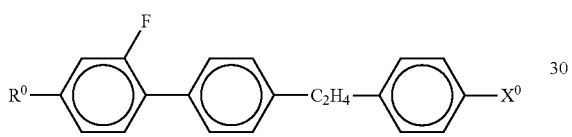

XVI in which $R^0$, $X^0$, $Y^1$ and $Y^2$ have the meanings indicated above. Preferably, $R^0$ denotes alkyl having 1 to 8 C atoms and $X^0$ denotes F or Cl.

The compounds of the formulae XIII and XIV are preferably selected from the group consisting of the following formulae:

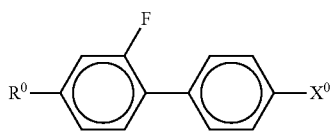

XIIIa

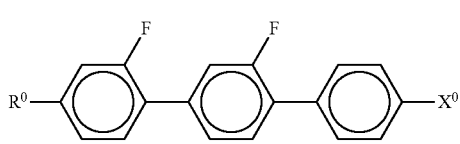

XIVa

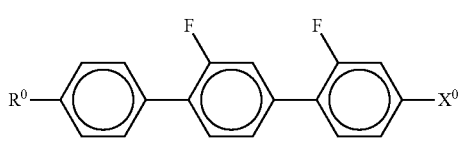

XVa in which $R^0$ and $X^0$ have the meanings indicated above. $R^0$ preferably denotes alkyl having 1 to 8 C atoms. In the compounds of the formula XIII, $X^0$ preferably denotes F or Cl.

LC medium which additionally comprises one or more compounds of the formulae D1 and/or D2:

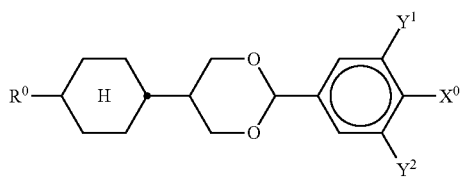

D1

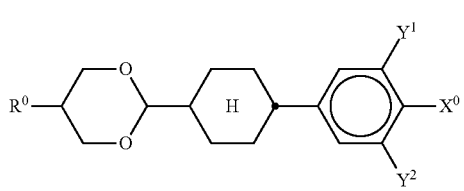

D2 in which $Y^1$, $Y^2$, $R^0$ and $X^0$ have the meanings indicated above. Preferably, $R^0$ denotes alkyl having 1 to 8 C atoms and $X^0$ denotes F. Particular preference is given to compounds of the following formulae:

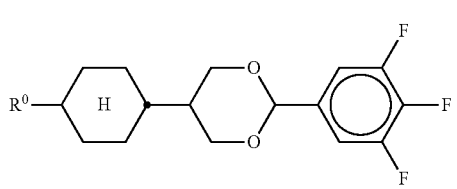

D1-1

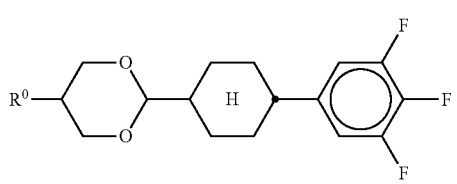

D2-1 in which $R^0$ has the meanings indicated above and preferably denotes straight-chain alkyl having 1 to 6 C atoms, in particular $C_2H_5$, n-$C_3H_7$ or n-$C_5H_{11}$.

LC medium which additionally comprises one or more compounds of the following formula:

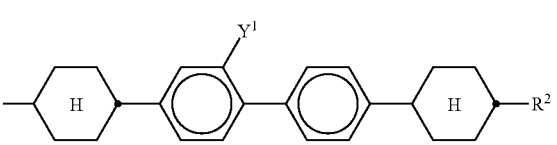

XVII in which $Y^1$, $R^1$ and $R^2$ have the meanings indicated above. $R^1$ and $R^2$ preferably each, independently of one another, denote alkyl having 1 to 8 C atoms;

LC medium which additionally comprises one or more compounds of the following formula:

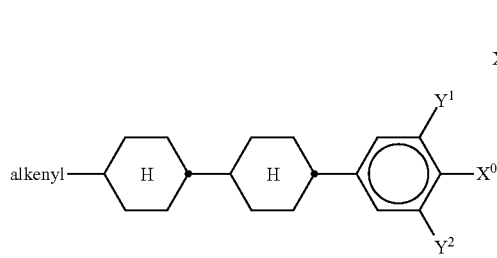
XVIII in which $X^0$, $Y^1$ and $Y^2$ have the meanings indicated above, and "alkenyl" denotes $C_{2-7}$-alkenyl. Particular preference is given to compounds of the following formula:

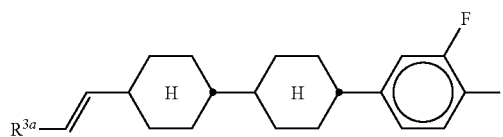
XVIIIa in which $R^{3a}$ has the meaning indicated above and preferably denotes H;

LC medium which additionally comprises one or more tetracyclic compounds selected from the group consisting of the formulae XIX to XXV:

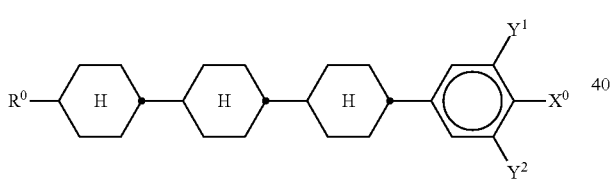
XIX

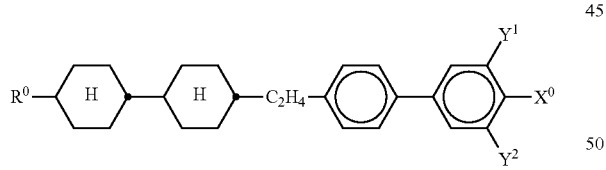
XX

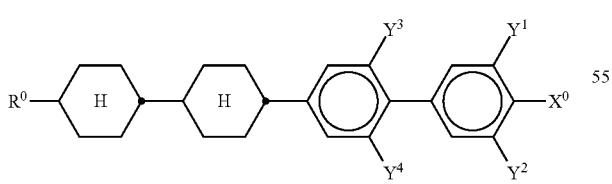
XXI

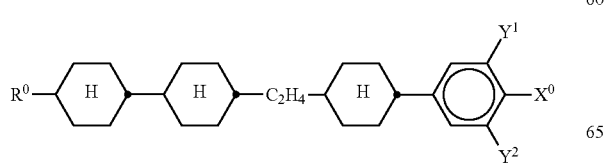
XXII

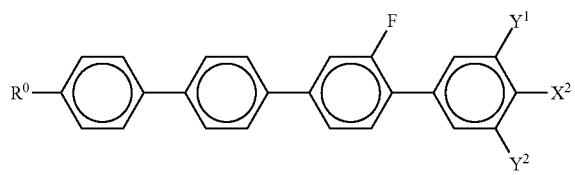
XXIII

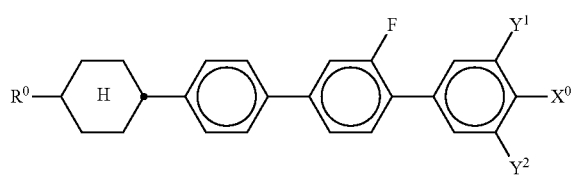
XXIV

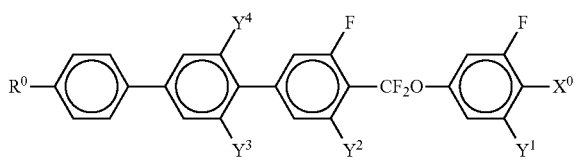
XXV in which $Y^{1-4}$, $R^0$ and $X^0$ each, independently of one another, have one of the meanings indicated above. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 8 C atoms.

LC medium which additionally comprises one or more compounds of the following formula:

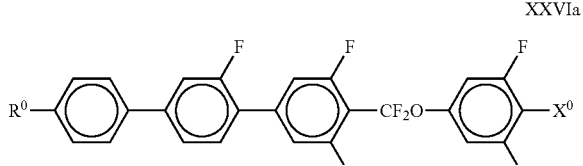
XXVI in which $R^0$, $X^0$ and $Y^{1-4}$ have the meanings indicated above.

Particular preference is given to compounds of the following formula:

XXVIa

LC medium which additionally comprises one or more compounds of the following formula:

XXVII

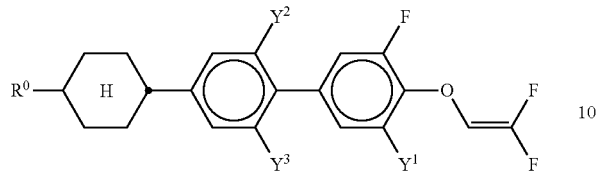

in which $R^0$ and $Y^{1-3}$ have the meanings indicated above. Particular preference is given to compounds of the following formulae:

XXVIIa

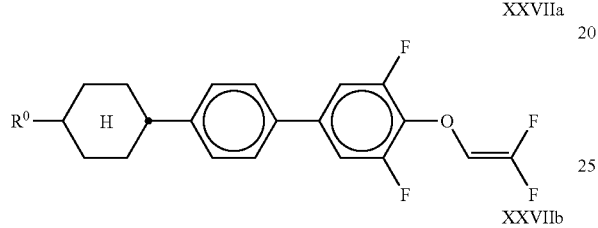

XXVIIb

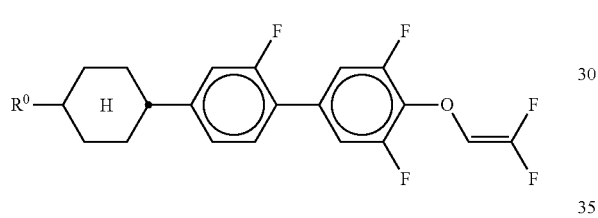

in which $R^0$ has the meaning indicated above and preferably denotes alkyl, alkoxy, oxaalkyl, fluoroalkyl or alkenyl, each having up to 8 C atoms.

LC medium which additionally comprises one or more compounds of the following formula:

XXVIII

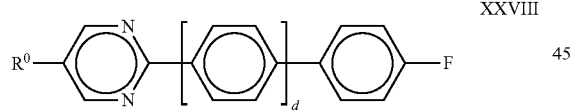

in which $R^0$ has the meaning indicated above and is preferably straight-chain alkyl having 2-5 C atoms, and d denotes 0 or 1, preferably 1. Preferred mixtures comprise 3-30% by weight, in particular 5-20% by weight, of this (these) compound(s).

LC medium which additionally comprises one or more compounds of the following formula:

XXIX

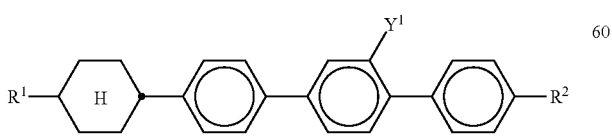

in which $Y^1$, $R^1$ and $R^2$ have the meanings indicated above. $R^1$ and $R^2$ preferably each, independently of one another, denote alkyl having 1 to 8 C atoms. $Y^1$ preferably denotes F. Preferred mixtures comprise 1-15% by weight, in particular 1-10% by weight, of these compounds.

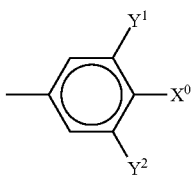

is preferably

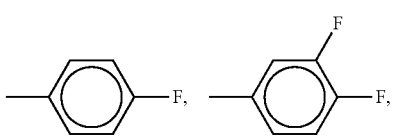

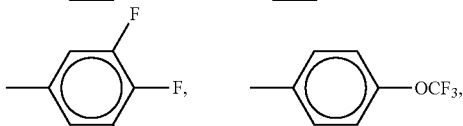

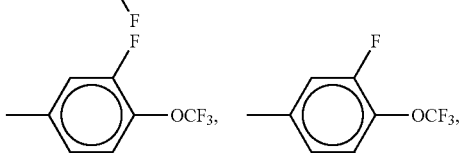

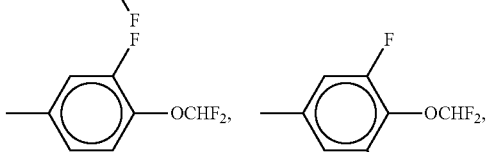

$R^0$ is preferably straight-chain alkyl or alkenyl having 2 to 7 C atoms;

$X^0$ is preferably F, furthermore $OCF_3$, Cl or $CF_3$;

The medium preferably comprises two or more, particularly preferably three or more compounds of the formula I or selected from the formulae I1 to I53;

The medium preferably comprises one or more compounds selected from the group of the compounds of the formulae II, III, VI-2, XI, XII, XIII, XIV, XXIV, XXV, XXVI, XXVII and XXIX;

The medium preferably comprises at least 25% by weight, particularly preferably 30-75% by weight, of compounds selected from the formulae XII, XIII, XIV, XV, XXIII, XXIV, XXV, XXVI and XXIX, in particular XII, XIII, XIV, XV, XXV and XXIX (high Δn values, for example, arise);

The medium preferably comprises in each case one or more compounds of the formulae VI-2, XI and XXVI;

The proportion of compounds of the formulae II-XXVIII in the mixture as a whole is preferably at least 20% by weight;

The medium preferably comprises at least 25% by weight, particularly preferably 30-70% by weight, of compounds of the formulae II and/or III;

The medium preferably comprises 5-50% by weight, particularly preferably 25-60% by weight, of compounds of the formula IIa, in particular in which $R^{3a}$ denotes H;

The medium preferably comprises 2-20% by weight, particularly preferably 3-15% by weight, of compounds of the formula VI-2;

The medium comprises 2-20% by weight, particularly preferably 3-15% by weight, of compounds of the formula XI;

The medium preferably comprises 1-20% by weight, particularly preferably 2-15% by weight, of compounds of the formula XXIV;

The medium preferably comprises 1-% by weight, particularly preferably 2-15% by weight, of compounds of the formula XXV;

The medium preferably comprises 1-25% by weight, particularly preferably 2-20% by weight, of compounds of the formula XXVI;

The medium preferably comprises 1-35% by weight, particularly preferably 5-30% by weight, of compounds of the formula XXVII;

The medium preferably comprises one or more compounds selected from the group of the compounds of the formulae VI-2, VII-1a, VII-1b, IX, X, XI and XXVI ($CF_2O$-bridged compounds).

It has been found that even a high proportion of compounds of the formula I mixed with conventional liquid-crystal materials, but in particular with one or more compounds of the formulae II to XXIX, results in very high values of the birefringence, with broad nematic phases having low smectic-nematic transition temperatures being observed at the same time, improving the storage stability. Owing to the high solubility of the thiophene derivatives, the mixtures can also be employed at low temperatures. At the same time, the mixtures exhibit very low threshold voltages and good values for the VHR on exposure to UV.

The term "alkyl" or "alkyl*" in this application encompasses straight-chain and branched alkyl groups having 1-7 carbon atoms, in particular the straight-chain groups methyl, ethyl, propyl, butyl, pentyl, hexyl and heptyl. Groups having 1-6 carbon atoms are generally preferred.

The term "alkenyl" or "alkenyl*" in this application encompasses straight-chain and branched alkenyl groups having 2-7 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" in this application encompasses straight-chain groups containing at least one fluorine atom, preferably a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" in this application encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

The term "halogenated alkyl radical" preferably encompasses mono- or polyfluorinated and/or -chlorinated radicals. Perhalogenated radicals are included. Particular preference is given to fluorinated alkyl radicals, in particular $CF_3$, $CH_2CF_3$, $CH_2CHF_2$, $CHF_2$, $CH_2F$, $CHFCF_3$ and $CF_2CHFCF_3$.

If $R^0$ in the formulae above and below denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If $R^0$ denotes an alkyl radical in which a $CH_2$ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl. These radicals may also be mono- or polyhalogenated.

If $R^0$ denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

In the formulae above and below, $X^0$ is preferably F, Cl or a mono- or polyfluorinated alkyl or alkoxy radical having 1, 2 or 3 C atoms or a mono- or polyfluorinated alkenyl radical having 2 or 3 C atoms. $X^0$ is particularly preferably F, Cl, $CF_3$, $CHF_2$, $OCF_3$, $OCHF_2$, $OCFHCF_3$, $OCFHCHF_2$, $OCFHCH_2F$, $OCF_2CH_3$, $OCF_2CHF_2$, $OCF_2CH_2F$, $OCF_2CF_2CHF_2$, $OCF_2CF_2CH_2F$, $OCFHCF_2CF_3$, $OCFHCF_2CHF_2$, OCH=$CF_2$, OCF=$CF_2$, $OCF_2CHFCF_3$, $OCF_2CF_2CF_3$, $OCF_2CF_2CClF_2$, $OCClFCF_2CF_3$, CF=$CF_2$, CF=CHF, or CH=$CF_2$, very particularly preferably F, $OCF_3$ or OCH=$CF_2$.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. The mixtures according to the invention are distinguished, in particular, by high $K_1$ values and thus have significantly faster response times than the mixtures from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the mixtures according to the invention is not crucial. The mixtures can therefore comprise one or more further components for the purposes of optimisation of various properties. However, the observed effect on the desired improvement in the properties of the mixture is generally greater, the higher the total concentration of compounds of the above-mentioned formulae.

In a particularly preferred embodiment, the media according to the invention comprise compounds of the formulae IV to VIII in which $X^0$ denotes F, $OCF_3$, $OCHF_2$, $OCH=CF_2$, $OCF=CF_2$ or $OCF_2-CF_2H$. A favourable synergistic action with the compounds of the formula I results in particularly advantageous properties. In particular, mixtures comprising compounds of the formulae I, VI and XI are distinguished by their low threshold voltages.

The individual compounds of the above-mentioned formulae and the sub-formulae thereof which can be used in the media according to the invention are either known or can be prepared analogously to the known compounds.

The invention also relates to electro-optical displays, such as, for example, TN, STN, TFT, OCB, IPS, FFS or MLC displays, having two planeparallel outer plates, which, together with a frame, form a cell, integrated non-linear elements for switching individual pixels on the outer plates, and a nematic liquid-crystal mixture having positive dielectric anisotropy and high specific resistance located in the cell, which contain media of this type, and to the use of these media for electro-optical purposes.

The liquid-crystal mixtures according to the invention enable a significant broadening of the available parameter latitude. The achievable combinations of clearing point, viscosity at low temperature, thermal and UV stability and high optical anisotropy are far superior to previous materials from the prior art.

The mixtures according to the invention are particularly suitable for mobile applications and high-$\Delta n$ TFT applications, such as, for example, PDAs, notebooks, LCD TVs and monitors.

The liquid-crystal mixtures according to the invention, with retention of the nematic phase down to -20° C. and preferably down to -30° C., particularly preferably down to -40° C., and of the clearing point ≥70° C., preferably ≥75° C., simultaneously enable rotational viscosities $\gamma_1$ of 100 mPa·s, particularly preferably ≤70 mPa·s, to be achieved, enabling excellent MLC displays having fast response times to be obtained.

The dielectric anisotropy $\Delta\in$ of the liquid-crystal mixtures according to the invention is preferably ≥+3, particularly preferably ≥+5. In addition, the mixtures are characterised by low operating voltages. The threshold voltage of the liquid-crystal mixtures according to the invention is preferably ≤2 V, in particular ≤1.5 V.

The birefringence $\Delta n$ of the liquid-crystal mixtures according to the invention is preferably ≥0.11, particularly preferably ≥0.14.

The nematic phase range of the liquid-crystal mixtures according to the invention preferably has a width of at least 80°, in particular at least 90°. This range preferably extends at least from -20° C. to +70° C.

It goes without saying that, through a suitable choice of the components of the mixtures according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain mixtures having higher $\Delta\in$ and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR on UV exposure than analogous mixtures comprising cyanophenylcyclohexanes of the formula

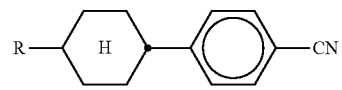

or esters of the formula

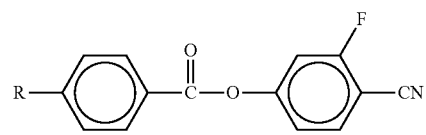

instead of the compounds of the formula I. The LC media are preferably 99% by weight, particularly preferably 100% by weight, free from benzonitrile derivatives.

The light stability and UV stability of the mixtures according to the invention are considerably better, i.e. they exhibit a significantly smaller decrease in the HR on exposure to light or UV. Even low concentrations of the compounds (<10% by weight) of the formula I in the mixtures increase the HR by 6% or more compared with mixtures from the prior art.

The LC media may also comprise further additives known to the person skilled in the art and described in the literature, such as, for example, UV stabilisers, such as Tinuvin® from Ciba, antioxidants, free-radical scavengers, nanoparticles, etc. For example, 0-15% of pleochroic dyes or chiral dopants can be added. Suitable stabilisers and dopants are mentioned below in Tables C and D.

The individual components of the above-mentioned preferred embodiments of the LC media according to the invention are either known or their preparation methods can readily be derived from the prior art by the person skilled in the relevant art since they are based on standard methods described in the literature.

It goes without saying to the person skilled in the art that the LC media according to the invention may also comprise compounds in which, for example, H, N, O, Cl, F have been replaced by the corresponding isotopes.

The liquid-crystal mixtures which can be used in accordance with the invention are prepared in a manner conventional per se, for example by mixing one or more compounds of the formula I with one or more compounds of the formulae II-XXVIII or with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The following examples explain the present invention without limiting it. However, they show the person skilled in the art preferred mixture concepts with compounds preferably to be employed and the respective concentrations thereof and combinations thereof with one another. In addition, the examples illustrate which properties and property combinations are accessible.

In the present application and in the examples below, the structures of the liquid-crystal compounds are indicated by means of acronyms, with the transformation into chemical formulae taking place in accordance with Tables A and B below. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}, R^{2*},$ $L^{1*}, L^{2*},$ $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO•m | $OC_nH_{2n+1}$ | $C_mH_{2m+1}$ | H | H |
| n | $C_nH_{2n+1}$ | CN | H | H |
| nN•F | $C_nH_{2n+1}$ | CN | F | H |
| nN•F•F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF•F | $C_nH_{2n+1}$ | F | F | H |
| nF•F•F | $C_nH_{2n+1}$ | F | F | F |
| nOCF$_3$ | $C_nH_{2n+1}$ | OCF$_3$ | H | H |
| nOCF$_3$•F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are found in Tables A and B.

TABLE A

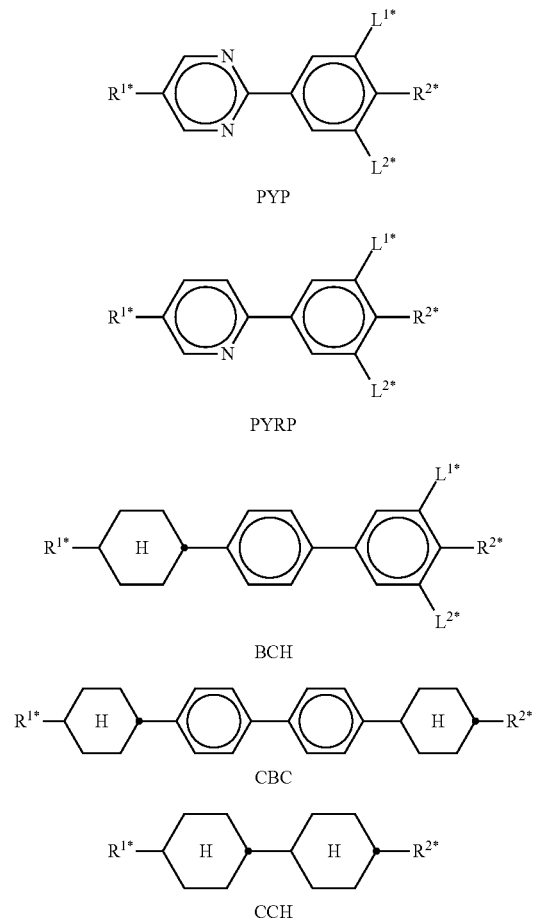

PYP

PYRP

BCH

CBC

CCH

TABLE A-continued
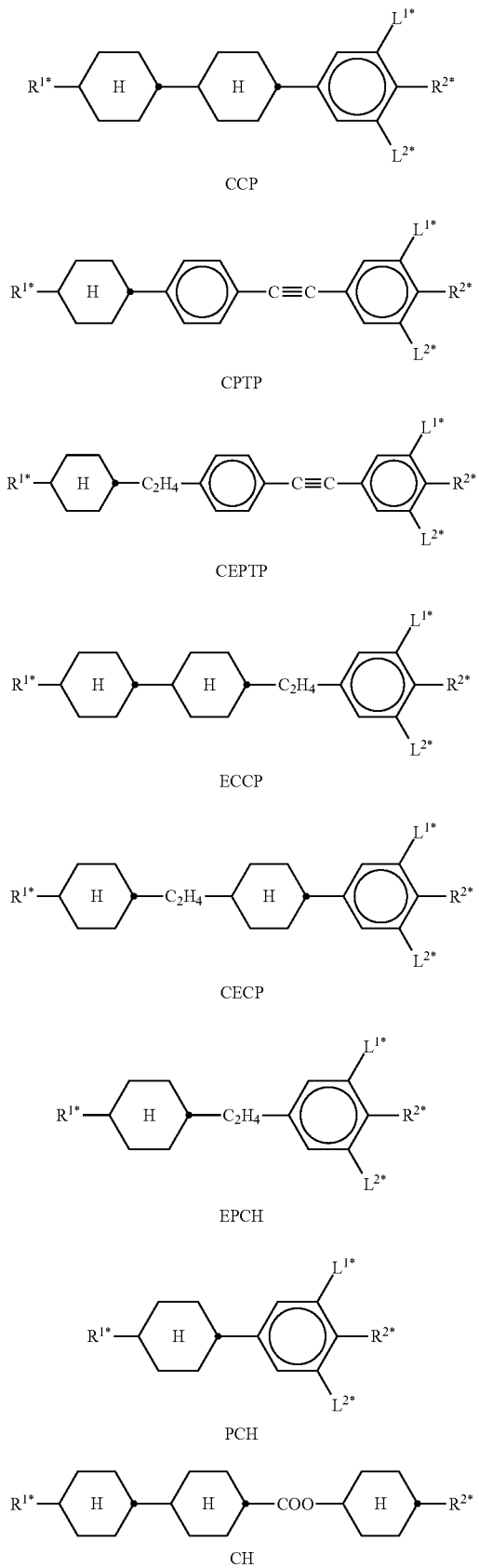
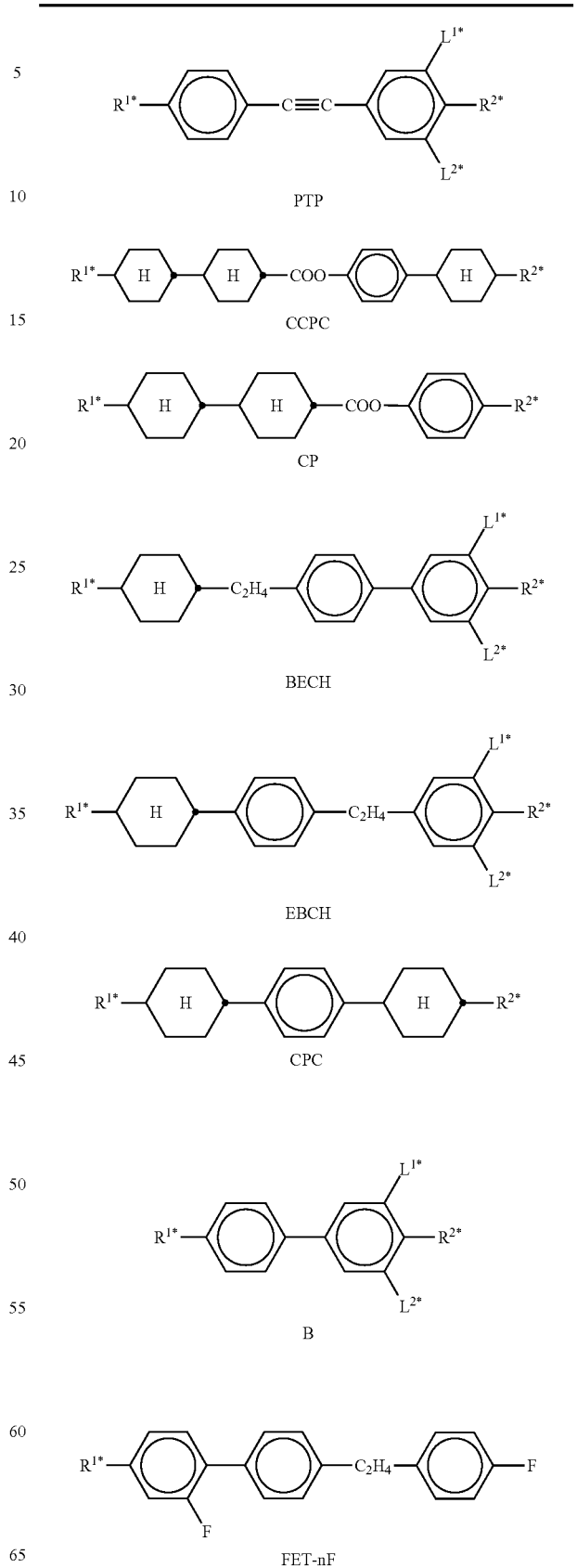

TABLE A-continued
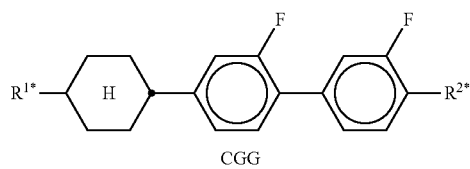
CGG
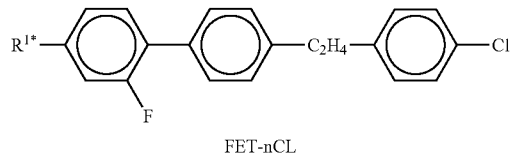
FET-nCL
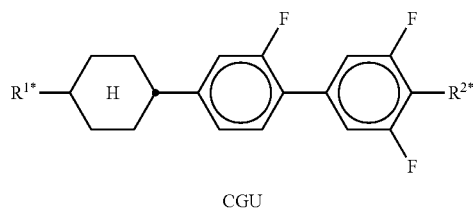
CGU
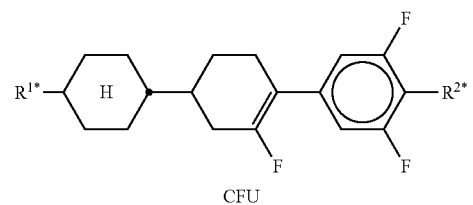
CFU
TABLE B
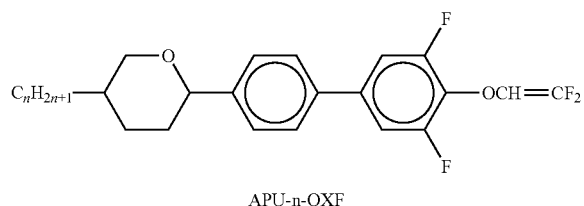
APU-n-OXF
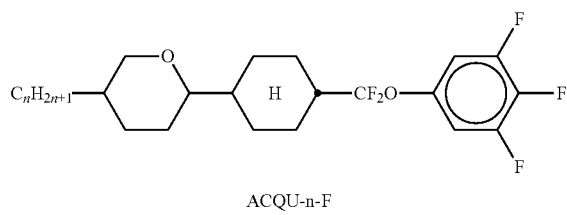
ACQU-n-F
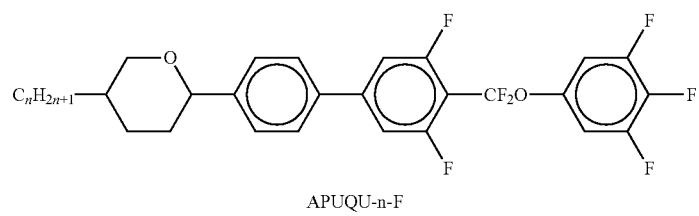
APUQU-n-F
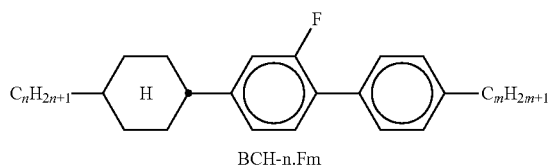
BCH-n.Fm
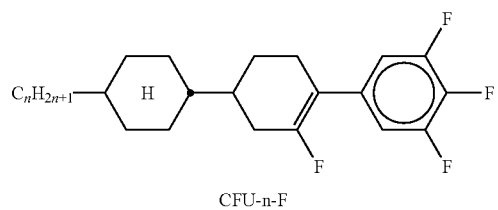
CFU-n-F TABLE B-continued
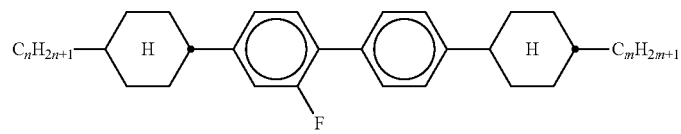
CBC-nmF
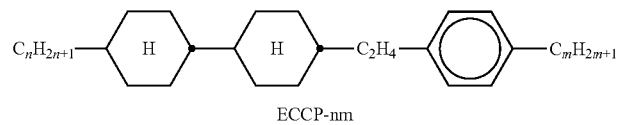
ECCP-nm
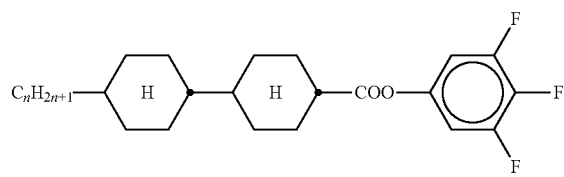
CCZU-n-F
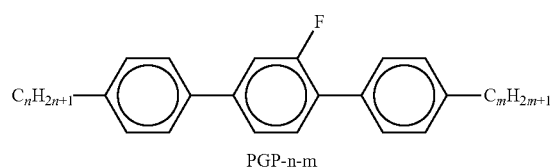
PGP-n-m
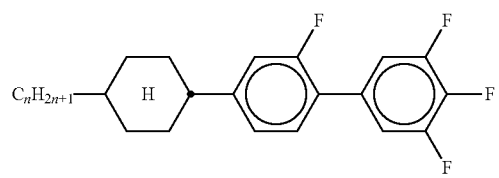
CGU-n-F
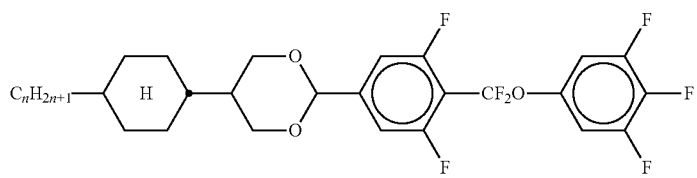
CDUQU-n-F
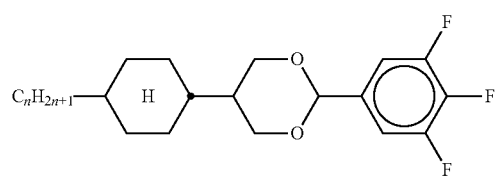
CDU-n-F
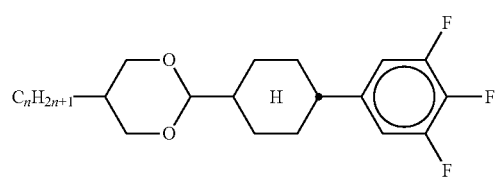
DCU-n-F TABLE B-continued
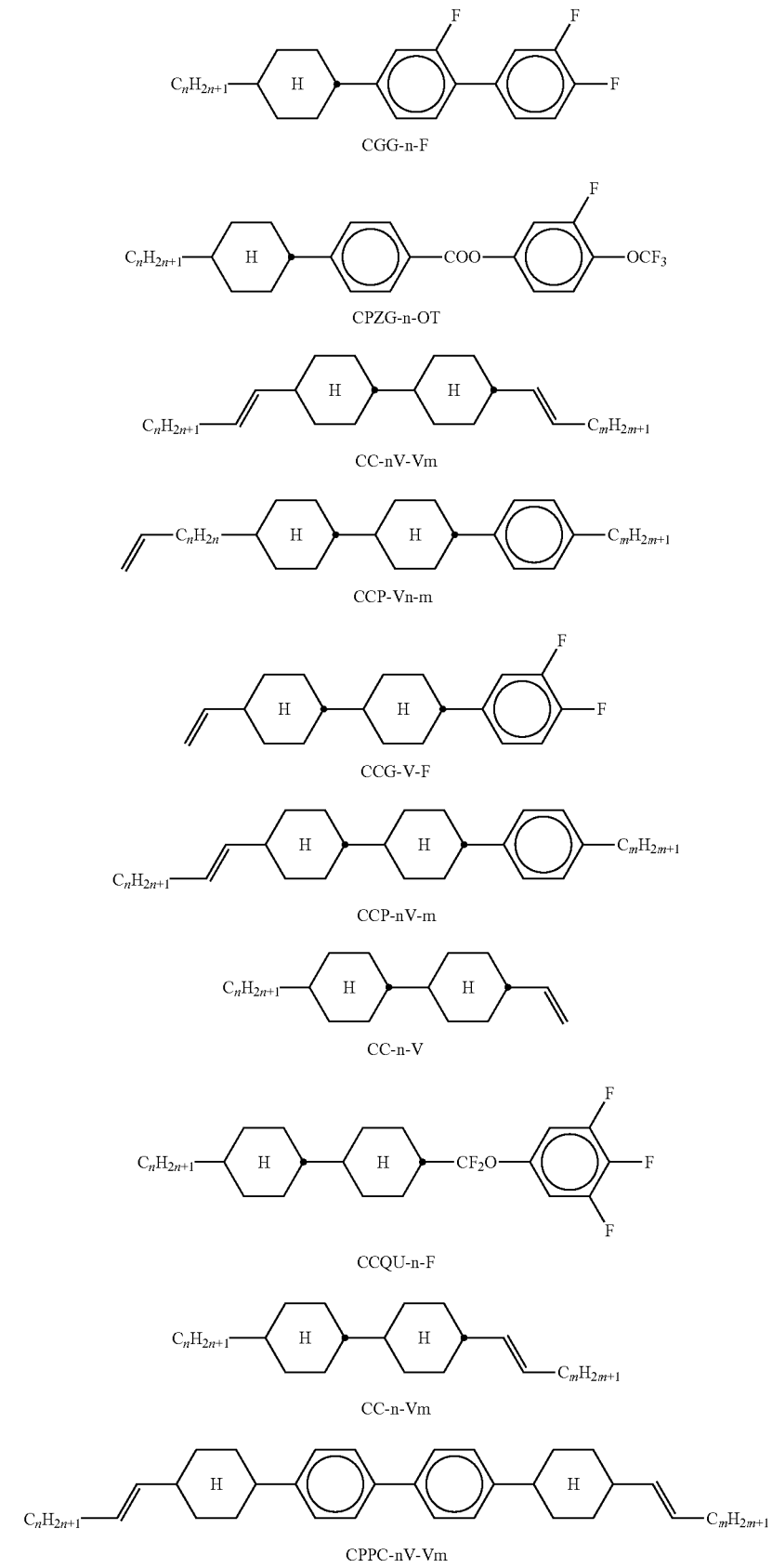

TABLE B-continued
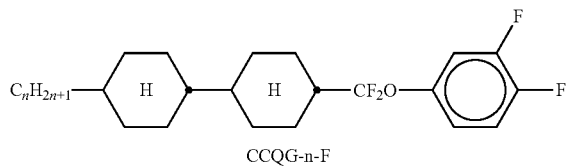
CCQG-n-F
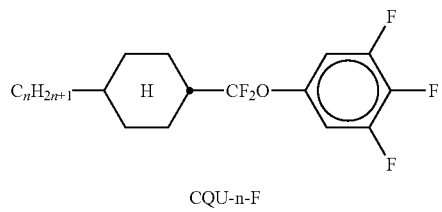
CQU-n-F
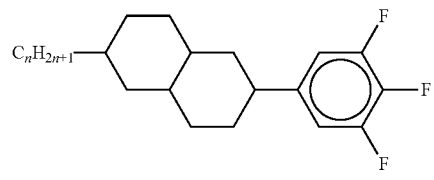
Dec-U-n-F
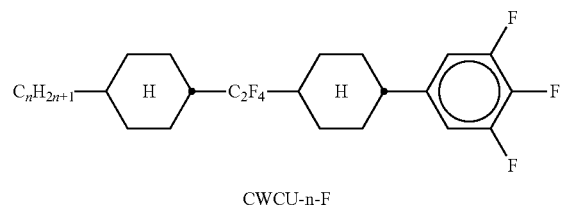
CWCU-n-F
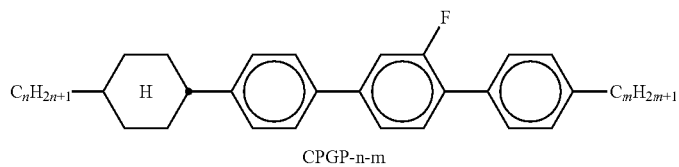
CPGP-n-m
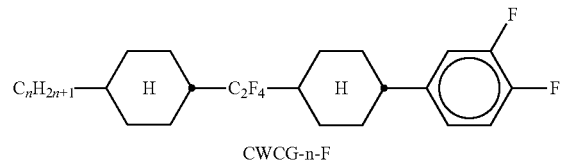
CWCG-n-F
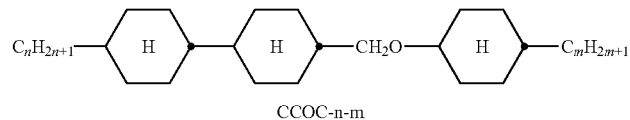
CCOC-n-m
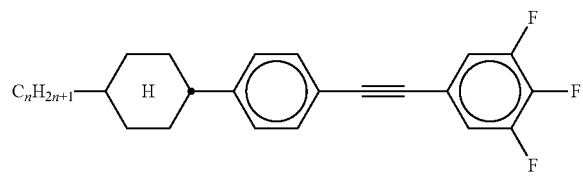
CPTU-n-F
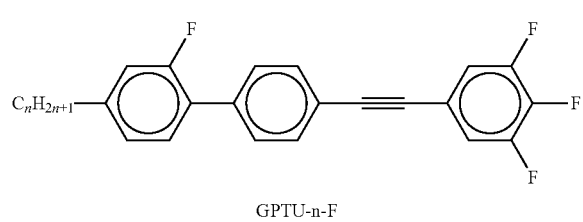
GPTU-n-F TABLE B-continued
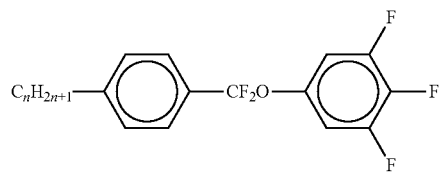
PQU-n-F
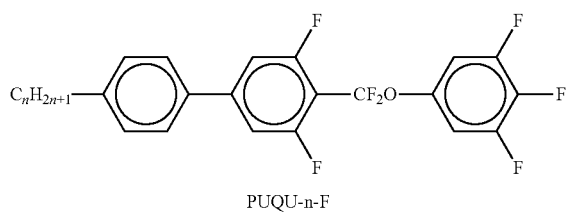
PUQU-n-F
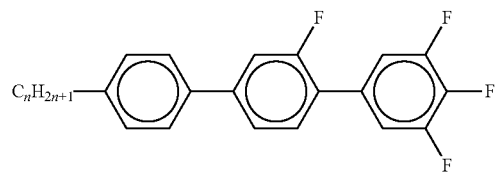
PGU-n-F
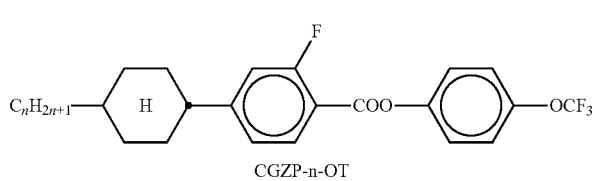
CGZP-n-OT
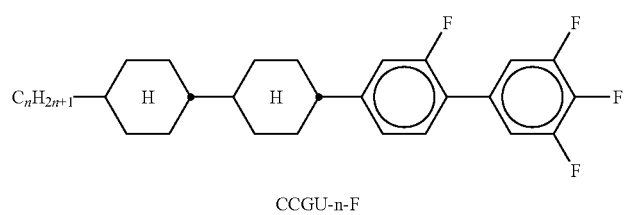
CCGU-n-F
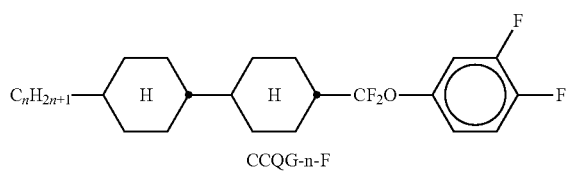
CCQG-n-F
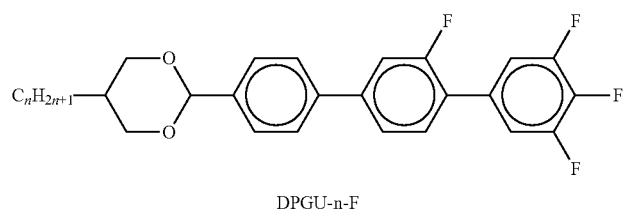
DPGU-n-F TABLE B-continued
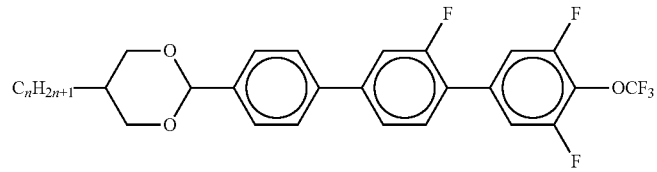
DPGU-n-OT
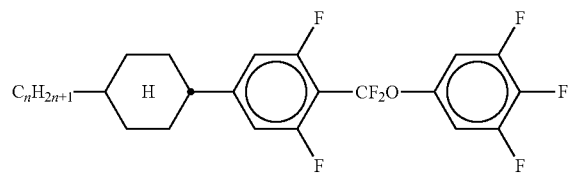
CUQU-n-F
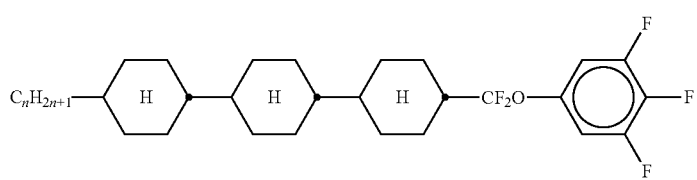
CCCQU-n-F
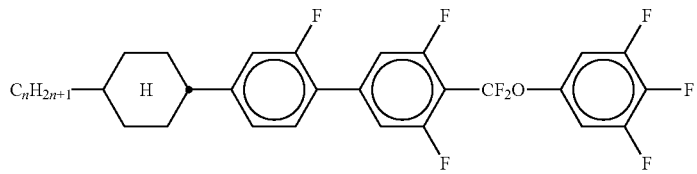
CGUQU-n-F
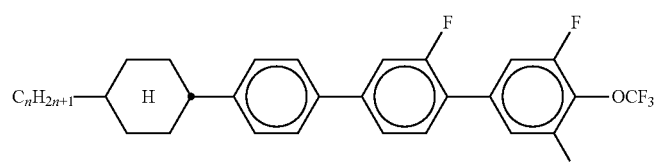
CPGU-n-OT
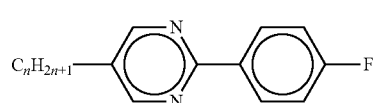
PYP-n-F
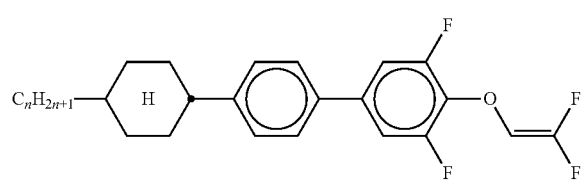
CPU-n-OXF TABLE B-continued
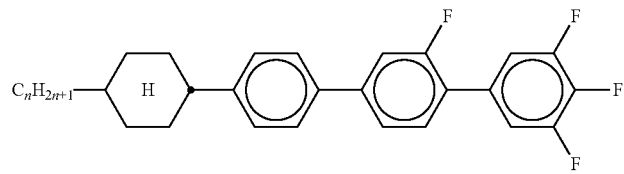
CPGU-n-F
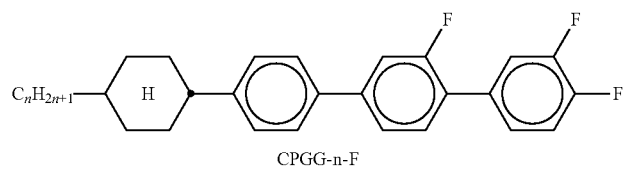
CPGG-n-F
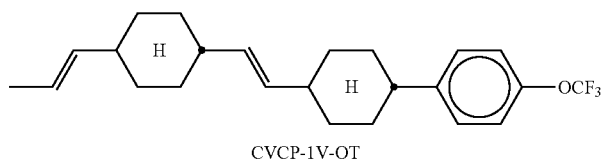
CVCP-1V-OT
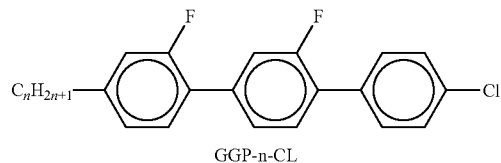
GGP-n-CL
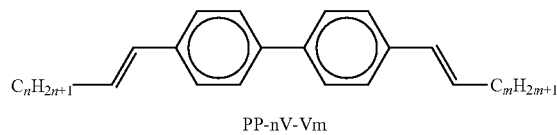
PP-nV-Vm
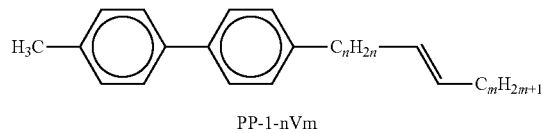
PP-1-nVm
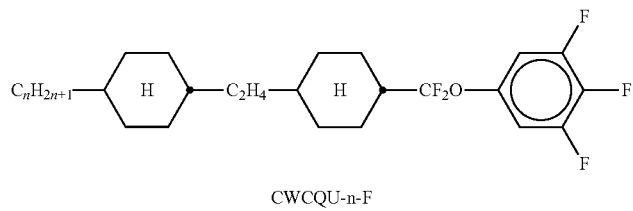
CWCQU-n-F
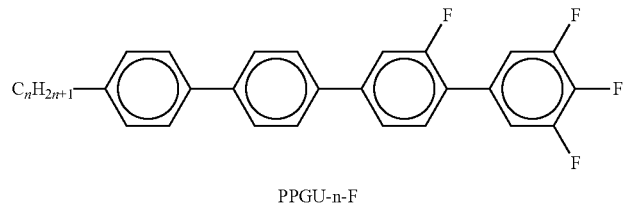
PPGU-n-F TABLE B-continued
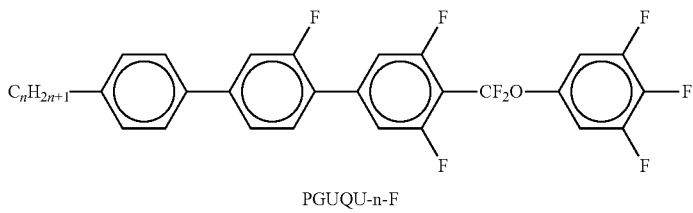
PGUQU-n-F
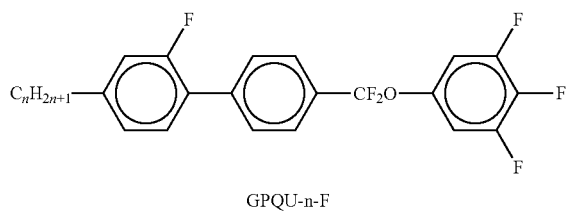
GPQU-n-F
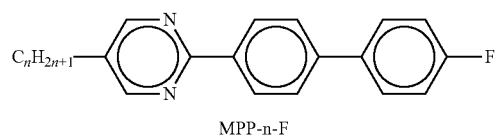
MPP-n-F
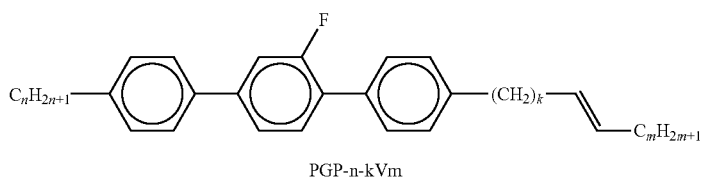
PGP-n-kVm
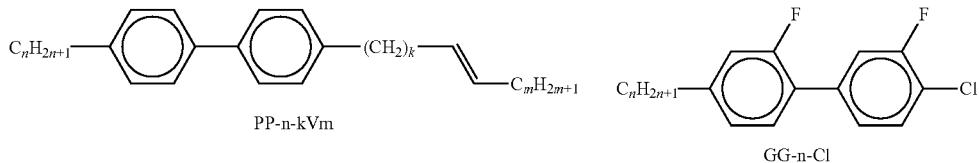
PP-n-kVm          GG-n-Cl
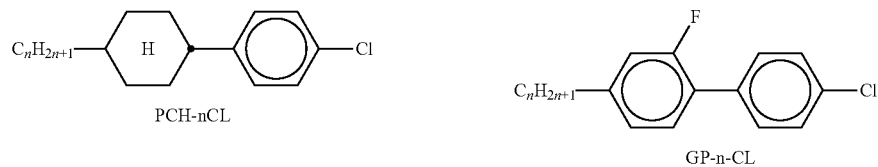
PCH-nCL           GP-n-CL
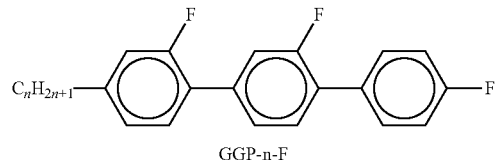
GGP-n-F
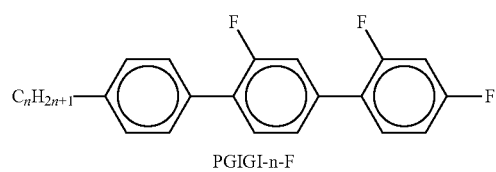
PGIGI-n-F TABLE B-continued
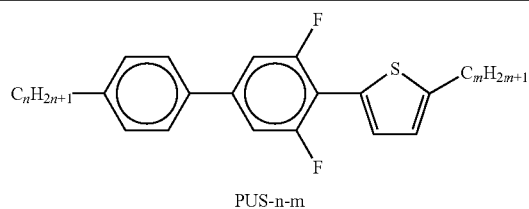
PUS-n-m
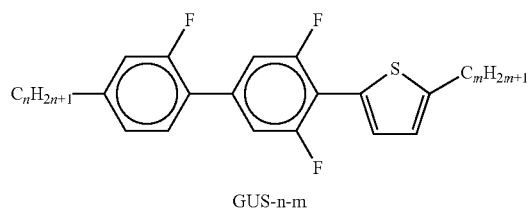
GUS-n-m
In a preferred embodiment of the present invention, the LC media according to the invention comprise one or more compounds selected from the group consisting of compounds from Tables A and B.
TABLE C
Table C indicates possible dopants which can be added to the LC media according to the invention.
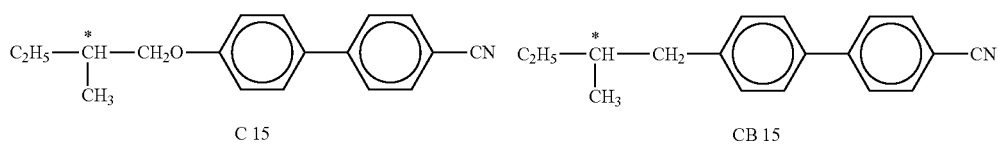
C 15        CB 15
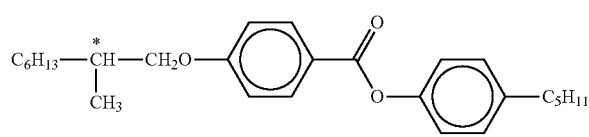
CM 21
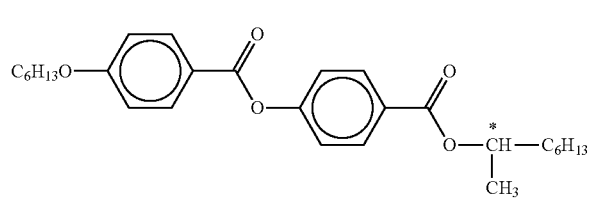
R/S-811
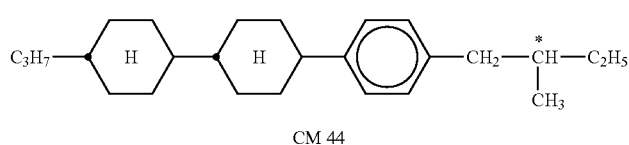
CM 44
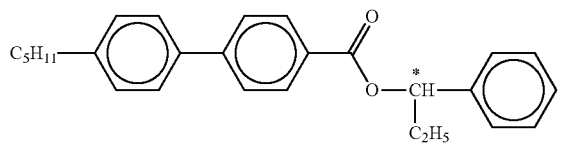
CM 45

TABLE C-continued
Table C indicates possible dopants which can be added to the LC media according to the invention.
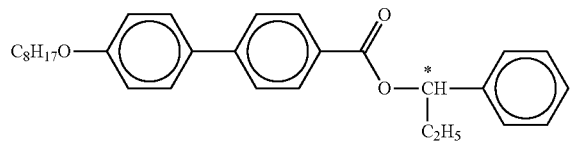
CM 47
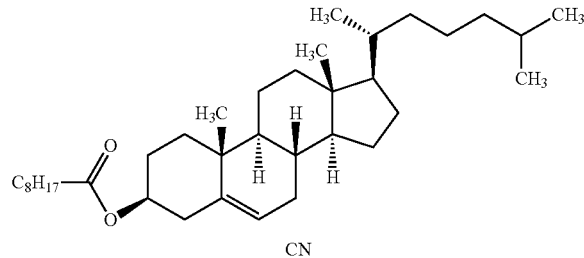
CN
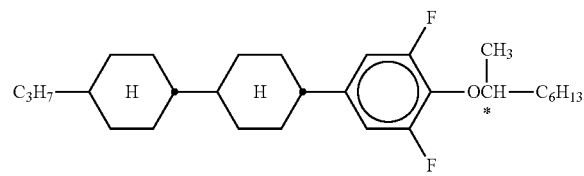
R/S-2011
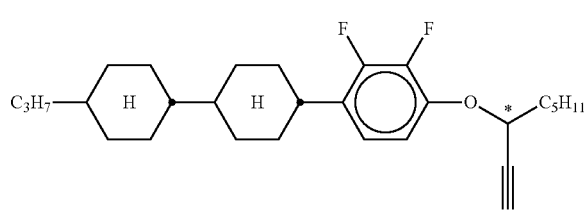
R/S-3011
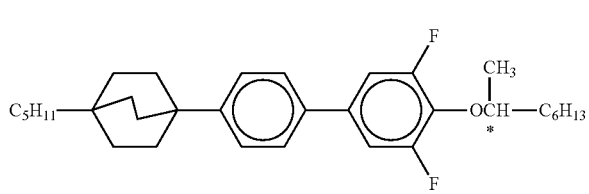
R/S-4011
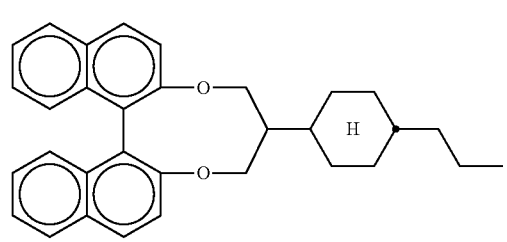
R/S-5011

TABLE C-continued

Table C indicates possible dopants which can be added to the LC media according to the invention.

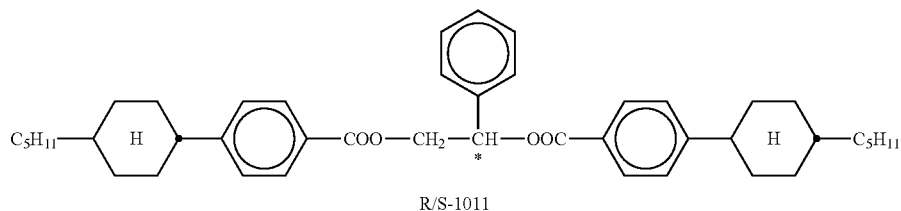

R/S-1011

The LC media preferably comprise 0 to 10% by weight, in particular 0.01 to 5% by weight and particularly preferably 0.1 to 3% by weight, of dopants. The LC media preferably comprise one or more dopants selected from the group consisting of compounds from Table C.

TABLE D

Table D indicates possible stabilisers which can be added to the LC media according to the invention.

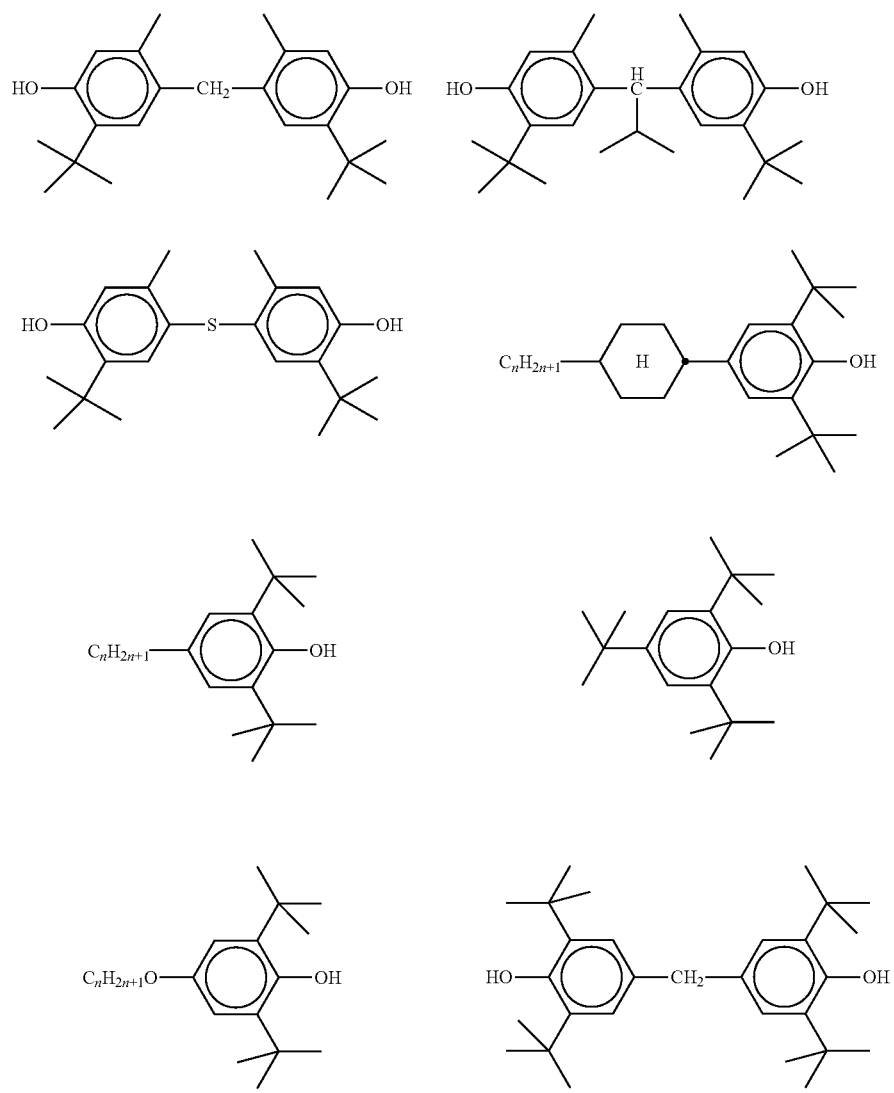

TABLE D-continued
Table D indicates possible stabilisers which can be added to the LC media according to the invention.
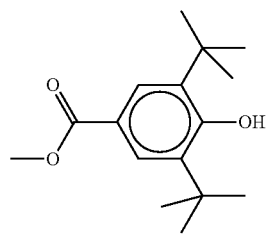
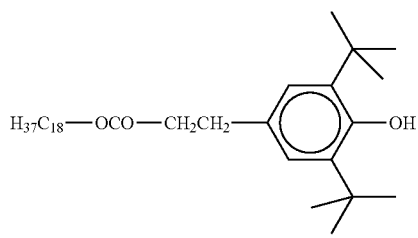
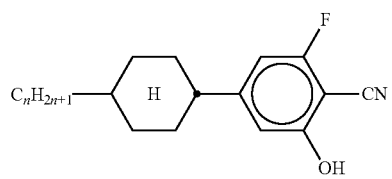
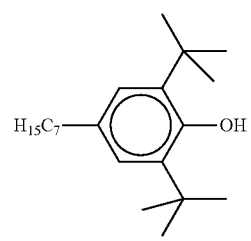
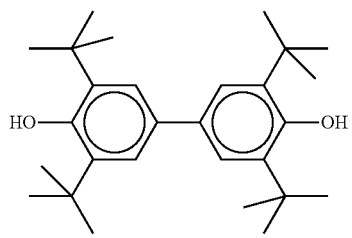
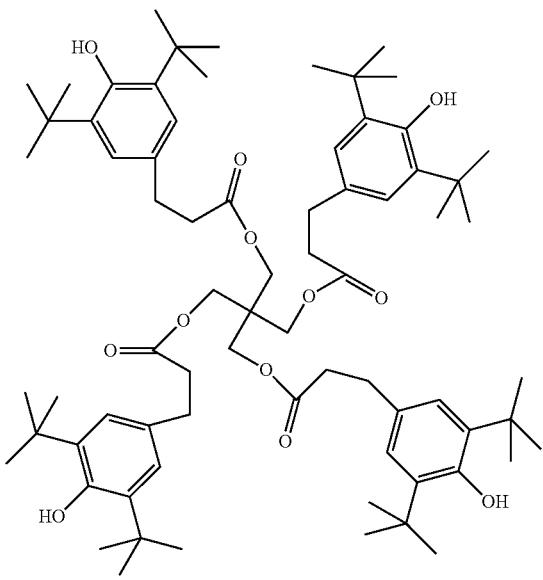 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE D-continued
Table D indicates possible stabilisers which can be added to the LC media according to the invention.
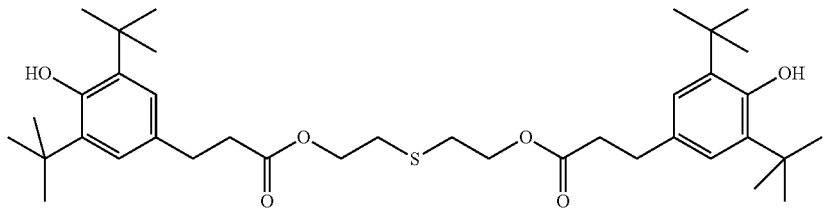 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
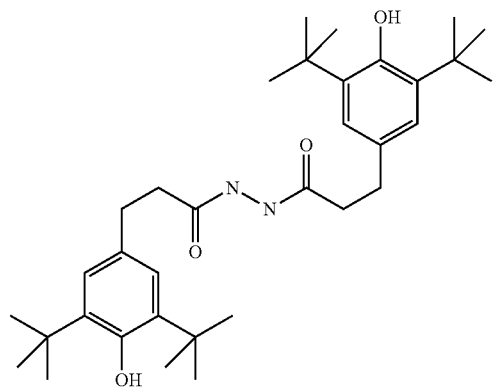 [SMILES: CC(C)(C)c1cc(CCC(=O)NNC(=O)CCc2cc(C(C)(C)C)c(O)c(C(C)(C)C)c2)cc(C(C)(C)C)c1O]
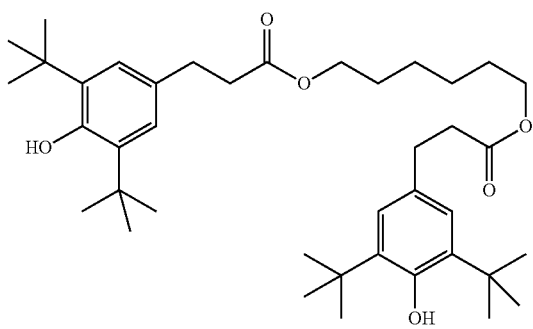 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
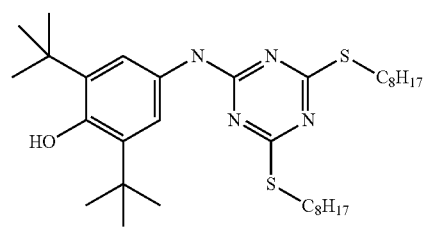

TABLE D-continued
Table D indicates possible stabilisers which can be added to the LC media according to the invention.
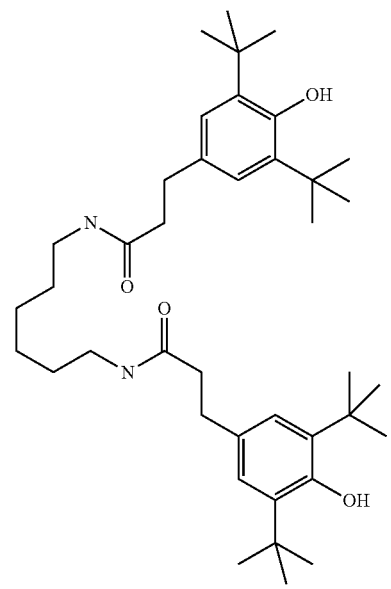 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
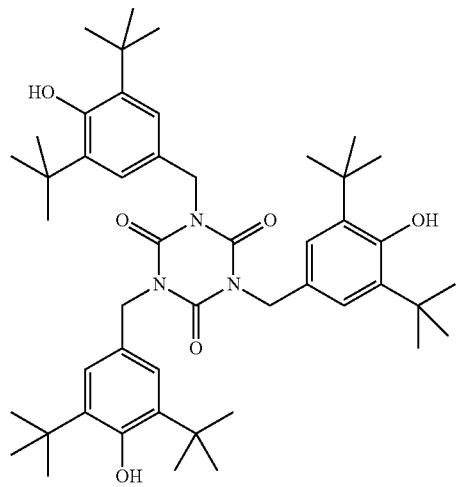 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
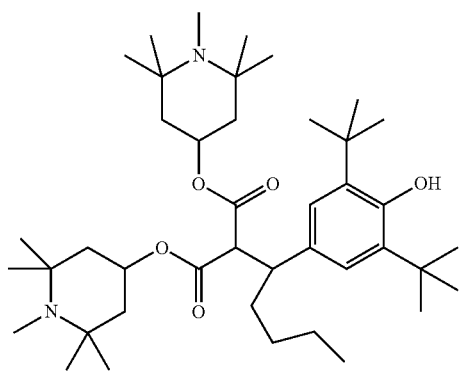 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE D-continued
Table D indicates possible stabilisers which can be added to the LC media according to the invention.
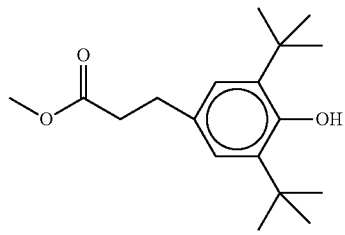
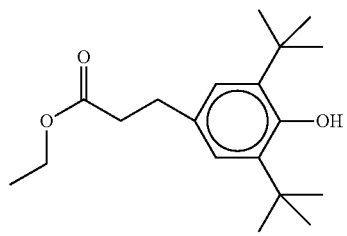
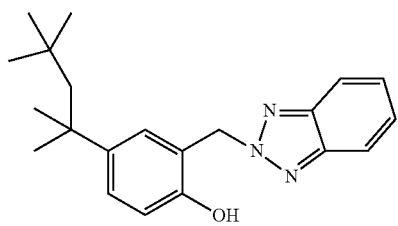 [SMILES: CC(C)(C)CC(C)(C)c1ccc(O)c(Cn2nc3ccccc3n2)c1]
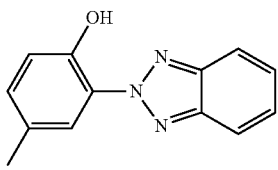 [SMILES: Cc1ccc(O)c(-n2nc3ccccc3n2)c1]
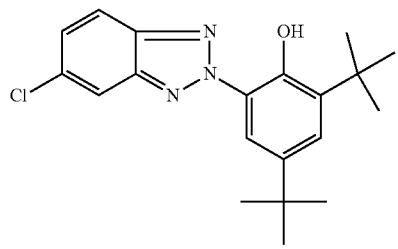 [SMILES: CC(C)(C)c1cc(-n2nc3ccc(Cl)cc3n2)c(O)c(C(C)(C)C)c1]
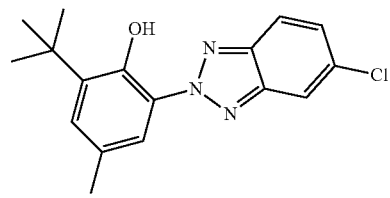 [SMILES: Cc1cc(-n2nc3ccc(Cl)cc3n2)c(O)c(C(C)(C)C)c1]
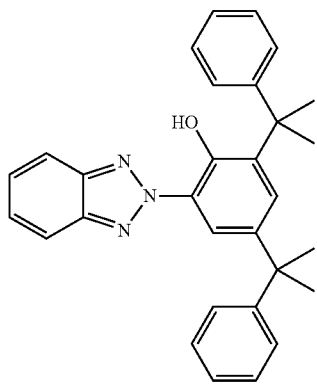 [SMILES: CC(C)(c1ccccc1)c1cc(-n2nc3ccccc3n2)c(O)c(C(C)(C)c2ccccc2)c1]
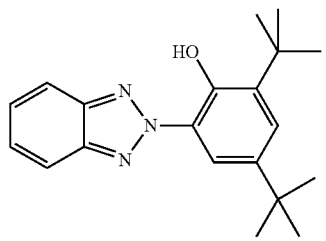 [SMILES: CC(C)(C)c1cc(-n2nc3ccccc3n2)c(O)c(C(C)(C)C)c1]
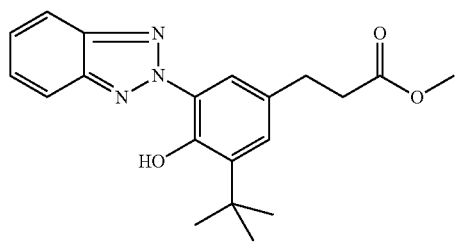 [SMILES: COC(=O)CCc1cc(-n2nc3ccccc3n2)c(O)c(C(C)(C)C)c1]
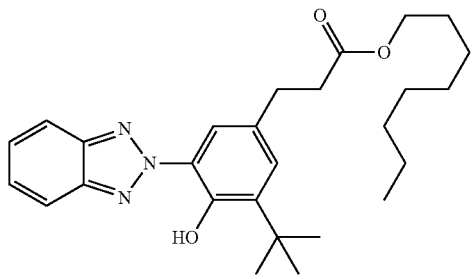 [SMILES: CCCCCCCCOC(=O)CCc1cc(-n2nc3ccccc3n2)c(O)c(C(C)(C)C)c1]

TABLE D-continued
Table D indicates possible stabilisers which can be added to the LC media according to the invention.
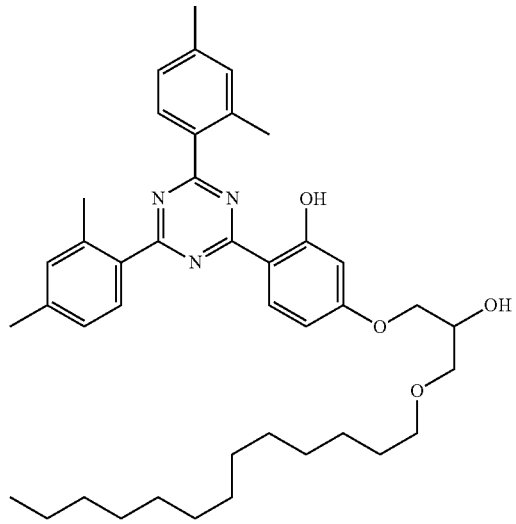 [SMILES: CCCCCCCCCCCCCOCC(O)COc1ccc(-c2nc(-c3ccc(C)cc3C)nc(-c3ccc(C)cc3C)n2)c(O)c1]
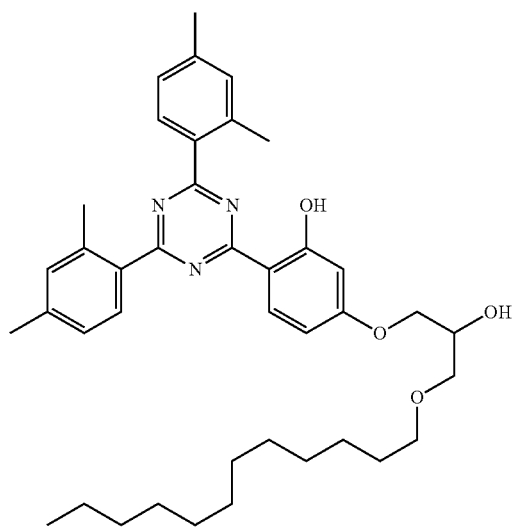
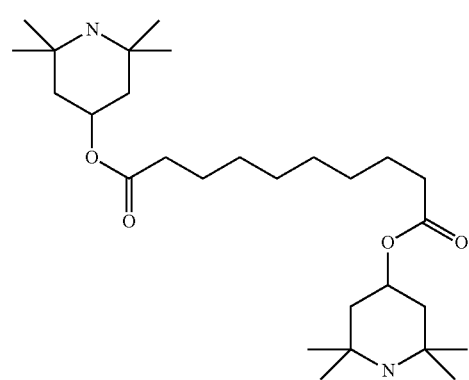

TABLE D-continued

Table D indicates possible stabilisers which can be added to the LC media according to the invention.

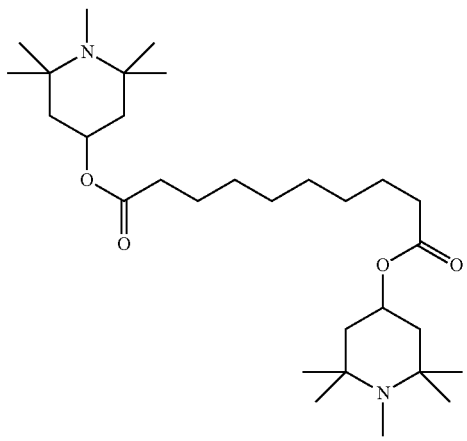

($n$ here denotes an integer from 1 to 12)

The LC media preferably comprise 0 to 10% by weight, in particular 0.01 to 5% by weight and particularly preferably 0.1 to 3% by weight, of stabilisers. The LC media preferably comprise one or more stabilisers selected from the group consisting of compounds from Table D.

In addition, the following abbreviations and symbols are used:

$V_0$ threshold voltage, capacitive [V] at 20° C.,
$V_{10}$ optical threshold for 10% relative contrast [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\in_\perp$ dielectric susceptibility perpendicular to the director at 20° C. and 1 kHz,
$\in_\parallel$ dielectric susceptibility parallel to the director at 20° C. and 1 kHz,
$\Delta\in$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN],
LTS low-temperature stability (phase), determined in test cells,
$HR_{20}$ voltage holding ratio at 20° C. [%] and
$HR_{100}$ voltage holding ratio at 100° C. [%].

Unless explicitly noted otherwise, all concentrations in the present application are indicated in percent by weight and relate to the corresponding mixture as a whole without solvents.

Unless explicitly noted otherwise, all temperature values indicated in the present application, such as, for example, the melting point T(C,N), the transition from the smectic (S) to the nematic (N) phase T(S,N) and the clearing point T(N,I), are indicated in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Darmstadt, Germany, and apply to a temperature of 20° C., and $\Delta n$ is determined at 589 nm and $\Delta\in$ at 1 kHz, unless explicitly indicated otherwise in each case.

The liquid-crystalline properties of the individual compounds are, unless indicated otherwise, determined in the nematic host mixture ZLI-4792 (commercially available from Merck KGaA, Darmstadt) at a concentration of 10%.

"Room temperature" means 20° C., unless indicated otherwise.

The term "threshold voltage" for the present invention relates to the capacitive threshold ($V_0$), also called the Freedericks threshold, unless explicitly indicated otherwise. In the examples, as generally usual, the optical threshold for 10% relative contrast ($V_{10}$) may also be indicated.

The test cells used for measurement of the capacitive threshold voltage $V_0$ and for $V_{10}$ are constructed from substrates consisting of soda-lime glass coated with polyimide alignment layers (Durimid 32 with diluent (70% of NMP+ 30% of xylene) in the ratio 1:4) from Arch Chemicals, which are rubbed antiparallel to one another and have a surface tilt of quasi 0 degrees. The area of the transparent, virtually square ITO electrodes is 1 cm². The capacitive threshold voltage is determined using a standard commercial high-resolution LCR meter (for example Hewlett Packard 4284A LCR meter).

EXAMPLES

Synthesis Examples

Example 1

2-(3,5-Difluoro-4'-propylbiphenyl-4-yl)-5-ethylthiophene (PUS-3-2)

The compound 2-(3,5-difluoro-4'-propylbiphenyl-4-yl)-5-ethylthiophene (PUS-3-2) is prepared as described below:

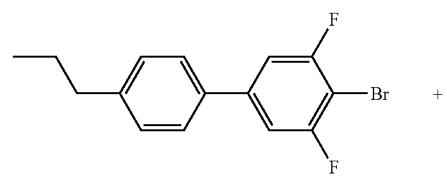

-continued

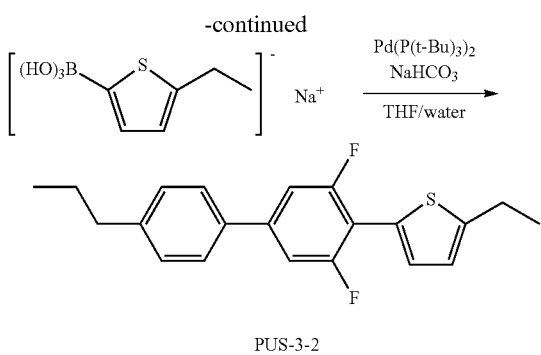

PUS-3-2

17.0 g (54.6 mmol) of 4-bromo-3,5-difluoro-4'-propylbiphenyl, 16.1 g (82.1 mmol) of 2-ethylthiophene-5-hydroxyboronic acid sodium salt and 9.2 g (0.11 mol) of sodium hydrogencarbonate are refluxed together with 700 mg (1.37 mmol) of bis(tri-tert-butylphosphine)palladium(0) in 250 ml of THF/water mixture (2:1). After 22 h, the mixture is diluted with MTBE, and the organic phase is separated off. The aqueous phase is extracted a number of times with MTBE, and the combined organic phases are washed with water and saturated sodium chloride solution. The solution is dried using sodium sulfate and evaporated to dryness. The crude product is purified by column chromatography ($SiO_2$, n-heptane). The further purification is carried out by recrystallisation from ethanol and n-heptane, giving 2-(3,5-difluoro-4'-propylbiphenyl-4-yl)-5-ethylthiophene (PUS-3-2) as a colourless solid (m.p. 45° C.).

Δ∈=+3.8
Δn=0.294
$γ_1$=76 mPa·s
C 45 N 90 I

Example 2

2-(3,5-Difluoro-4'-propylbiphenyl-4-yl)-5-propylthiophene (PUS-3-3)

The compound 2-(3,5-difluoro-4'-propylbiphenyl-4-yl)-5-propylthiophene (PUS-3-3) is prepared as described below:

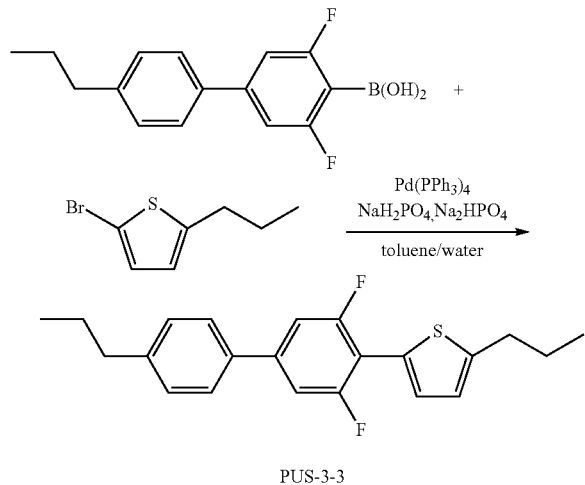

PUS-3-3

5.0 g (24.4 mmol) of 2-bromo-5-propylthiophene, 7.40 g (26.8 mmol) of 4'-propyl-3,5-difluoro-4-biphenylboronic acid and 2.82 g (2.44 mmol) of tetrakis(triphenylphosphine) palladium(0) are initially introduced in 160 ml of toluene. A solution of 5.85 g (48.8 mmol) of sodium dihydrogenphosphate and 13.8 g (97.5 mmol) of disodium hydrogenphosphate dodecahydrate in 50 ml of water is added, and the mixture is heated under reflux for 19 h. After cooling, the organic phase is separated off, and the aqueous phase is extracted a number of times with toluene. The combined organic phases are washed with water and sat. sodium chloride solution. The solution is dried using sodium sulfate and evaporated to dryness. The residue is purified by column chromatography ($SiO_2$, n-heptane). Further purification is carried out by recrystallisation from ethanol and n-heptane, giving 2-(3,5-difluoro-4'-propylbiphenyl-4-yl)-5-propylthiophene (PUS-3-3) as a colourless solid (m.p. 64° C.).

Δ∈=+4.2
Δn=0.283
$γ_1$=67 mPa·s
C 64 N 86 I

Example 3

2-(3,5-Difluoro-4'-ethylbiphenyl-4-yl)-5-ethylthiophene (PUS-2-2)

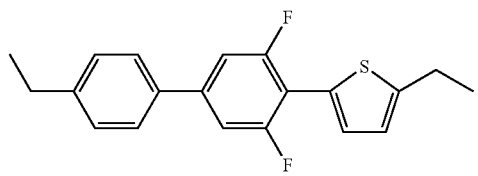

PUS-2-2

The compound 2-(3,5-difluoro-4'-ethylbiphenyl-4-yl)-5-ethylthiophene (PUS-2-2) is prepared analogously to Example 2 from 4'-ethyl-3,5-difluoro-4-biphenylboronic acid and 2-bromo-5-ethylthiophene.

Δ∈=+5.4
Δn=0.297
$γ_1$=58 mPa·s
C 48 N 62 I

Example 4

2-(3,5-Difluoro-4'-ethylbiphenyl-4-yl)-5-propylthiophene (PUS-2-3)

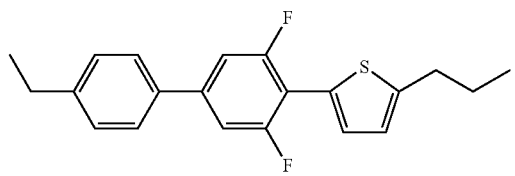

PUS-2-3

The compound 2-(3,5-difluoro-4'-ethylbiphenyl-4-yl)-5-propylthiophene (PUS-2-3) is prepared analogously to Example 2 from 4'-ethyl-3,5-difluoro-4-biphenylboronic acid and 2-bromo-5-propylthiophene.

Δ∈=+3.3
Δn=0.283
$γ_1$=61 mPa·s
C 50 N 61 I

Example 5

2-(4'-Ethyl-2,6-difluorobiphenyl-4-yl)-5-propylthiophene (SUP-3-2)

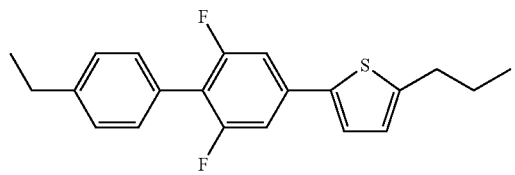

SUP-3-2

The compound 2-(4'-ethyl-2,6-difluorobiphenyl-4-yl)-5-propylthiophene (SUP-3-2) is prepared analogously to Example 1 from 4'-ethyl-2,6-difluoro-4-biphenylboronic acid and 2-bromo-5-propylthiophene.

$\Delta\epsilon = +5.5$
$\Delta n = 0.233$
$\gamma_1 = 110$ mPa·s
C 80 I

Example 6

2-(4'-Ethyl-2,6-difluorobiphenyl-4-yl)-5-ethylthiophene (SUP-2-2)

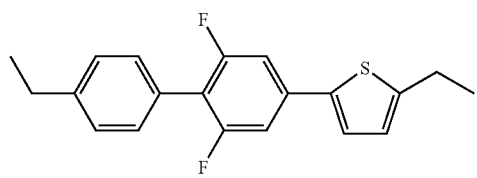

SUP-2-2

The compound 2-(4'-ethyl-2,6-difluorobiphenyl-4-yl)-5-ethylthiophene (SUP-2-2) is prepared analogously to Example 1 from 4'-ethyl-2,6-difluoro-4-biphenylboronic acid and 2-bromo-5-ethylthiophene.

MS (EI): m/e (%)=328 (100, M$^+$), 313 (89, [M-CH$_3$]$^{+\cdot}$
$\Delta\epsilon = +6.4$
$\Delta n = 0.302$
$\gamma_1 = 106$ mPa·s
C 106 I

Example 7

2-[2,6-Difluoro-4-(4-propylcyclohexyl)phenyl]-5-ethylthiophene (CUS-3-2)

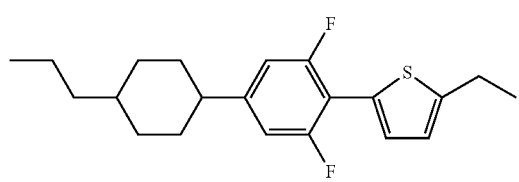

CUS-3-2

The compound 2-[2,6-difluoro-4-(4-propylcyclohexyl)phenyl]-5-ethylthiophene ("CUS-3-2") is prepared analogously to Example 3 from 2,5-difluoro-4-(4-propylcyclohexyl)benzeneboronic acid and 2-bromo-5-ethylthiophene.

$\Delta\epsilon = +3.0$
$\Delta n = 0.172$
$\gamma_1 = 107$ mPa·s
C 34 N 97 I

Example 8

2-(3,5-Difluoro-4'-propylbiphenyl-4-yl)-5-vinylthiophene (PUS-3-V)

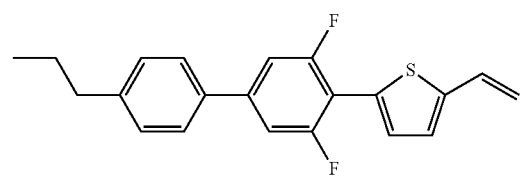

PUS-3-V

The compound 2-(3,5-difluoro-4'-propylbiphenyl-4-yl)-5-vinylthiophene (PUS-3-V) is prepared analogously to Example 3 from 4'-propyl-3,5-difluoro-4-biphenylboronic acid and 2-bromo-5-vinylthiophene.

$\Delta\epsilon = +6.5$
$\Delta n = 0.349$
$\gamma_1 = 163$ mPa·s
C 69 N 111 I

Example 9

2-(2-Fluoro-4'-pentylbiphenyl-4-yl)-5-hexylthiophene (PGIS-5-6)

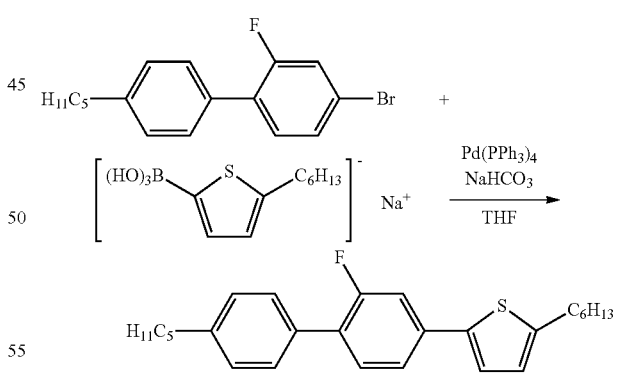

A mixture of 3.30 g (13.1 mmol) of 5-hexylthiophen-2-ylhydroxyboronic acid sodium salt, 4.20 g (13.1 mmol) of 4-bromo-2-fluoro-4'-pentylbiphenyl, 2.2 g (26.2 mmol) of sodium hydrogencarbonate and 0.70 g (0.61 mmol) of tetrakis(triphenylphosphine)palladium(0) in THF/water (1:1) is heated under reflux for 6 h. The mixture is diluted with MTBE, and the organic phase is separated off. The aqueous phase is extracted with MTBE. The combined organic phases are washed with sat. sodium chloride solution and dried using sodium sulfate. The solution is evaporated to dryness, and the residue is purified by column chromatography (SiO$_2$, n-heptane). The further purification is carried out by recrystallisation from methanol/pentane (5:1), giving 2-(2-fluoro-4'-pentylbiphenyl-4-yl)-5-hexylthiophene as a colourless solid having an m.p. of 44° C.

Δε=+3.2
Δn=0.231
γ$_1$=153 mPa·s
C 44 Sm (6) SmB (38) 5 mC 68 SmA 75 N 94 I

Mixture Examples

Mixture Example 1

A nematic LC mixture according to the invention is formulated as follows:

| | | | |
|---|---|---|---|
| PCH-301 | 10% | Cl.p. | +93° C. |
| PUS-2-2 | 10% | Δn | 0.243 |
| PUS-2-3 | 10% | Δε | +6.2 |
| PUS-3-2 | 10% | ε$_∥$ | 10.2 |
| PGU-3-F | 3% | | |
| GGP-3-CL | 9% | | |
| GGP-5-CL | 21% | | |
| FET-2CL | 4% | | |
| FET-5CL | 7% | | |
| PGIGI-3-F | 8% | | |
| CPGP-4-3 | 3% | | |
| CPGP-5-2 | 2% | | |
| DPGU-4-F | 3% | | |

Mixture Example 2

A nematic LC mixture according to the invention is formulated as follows:

| | | | |
|---|---|---|---|
| PCH-301 | 10% | Cl.p. [° C.] | +93.5 |
| PUS-2-2 | 15% | Δn | 0.259 |
| PUS-2-3 | 15% | Δε | +5.4 |
| PUS-3-2 | 20% | ε$_∥$ | 9.1 |
| PGU-3-F | 3% | | |
| GGP-3-CL | 9% | | |
| GGP-5-CL | 21% | | |
| CPGP-4-3 | 3% | | |
| CPGP-5-2 | 2% | | |
| DPGU-4-F | 2% | | |

Mixture Example 3

A nematic LC mixture according to the invention is formulated as follows:

| | | | |
|---|---|---|---|
| GG-2-CL | 4% | Cl.p. [° C.] | +93.5 |
| PUS-2-2 | 14% | Δn | 0.267 |
| PUS-2-3 | 14% | Δε | +6.8 |
| PUS-3-2 | 16% | ε$_∥$ | 10.7 |
| PGU-3-F | 5% | LTS | |
| GGP-3-CL | 9% | (bulk, −30° C.) | >360 h |
| GGP-5-CL | 21% | | |
| FET-5CL | 10% | | |
| CPGP-4-3 | 4% | | |
| CPGP-5-2 | 3% | | |

Further combinations of the embodiments and variants of the invention arise from the following claims.

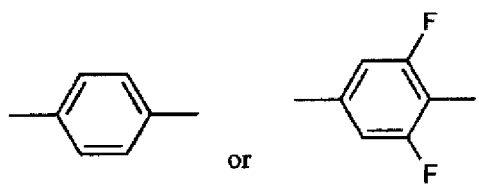

The invention claimed is:

1. An LC medium comprising one or more compounds of the formula I and having a content of 25% by weight or more of the one or more compounds of the formula I:

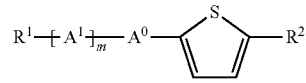

in which the individual radicals have the following meanings:

R$^1$ and R$^2$ denote H, F, Cl, Br, —CN, —SCN, —NCS, SF$_5$ or straight-chain or branched alkyl having 1 to 12 C atoms, in which, in addition, one or more non-adjacent CH$_2$ groups may each be replaced, independently of one another, by —CH=CH—, —C≡C—, —O—, —CO—, —CO—O—, —O—CO—, —O—CO—O— in such a way that O atoms are not linked directly to one another, and in which, in addition, one or more H atoms may be replaced by F, Cl or Br, A$^0$ denotes

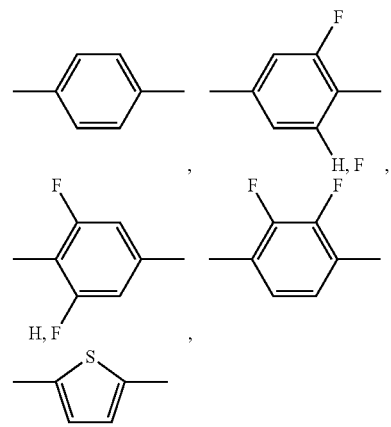

A$^1$, independently of one another, denotes phenylene-1,4-diyl, in which, in addition, one or two CH groups may be replaced by N and one or more H atoms may be replaced by halogen, CN, CH$_3$, CHF$_2$, CH$_2$F, OCH$_3$, OCHF$_2$ or OCF$_3$, cyclohexane-1,4-diyl, in which, in addition, one or two non-adjacent CH$_2$ groups may be replaced, independently of one another, by O and/or S and one or more H atoms may be replaced by F, cyclohexene-1,4-diyl, bicyclo[1.1.1]pentane-1,3-diyl, bicyclo[2.2.2]octane-1,4-diyl, spiro[3.3]heptane-2,6-diyl, tetrahydropyran-2,5-diyl or 1,3-dioxane-2,5-diyl, m in each case, independently of one another, denotes 0, 1 or 2.

2. LC medium according to claim 1, characterised in that it comprises one or more compounds selected from the group consisting of the following formulae:

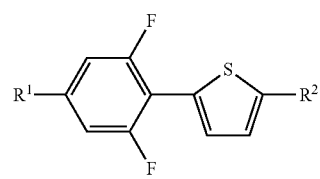

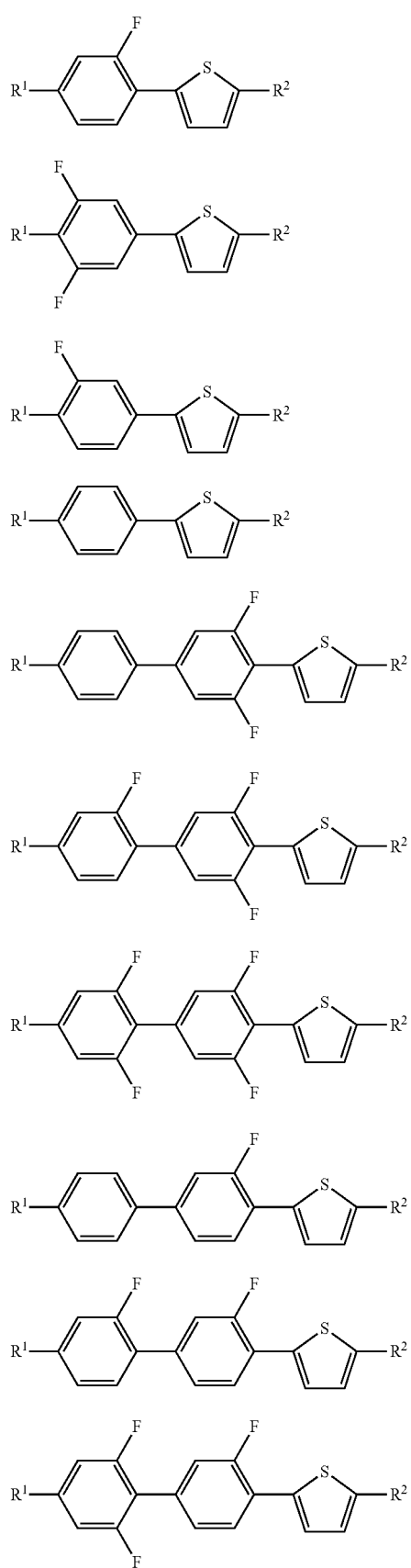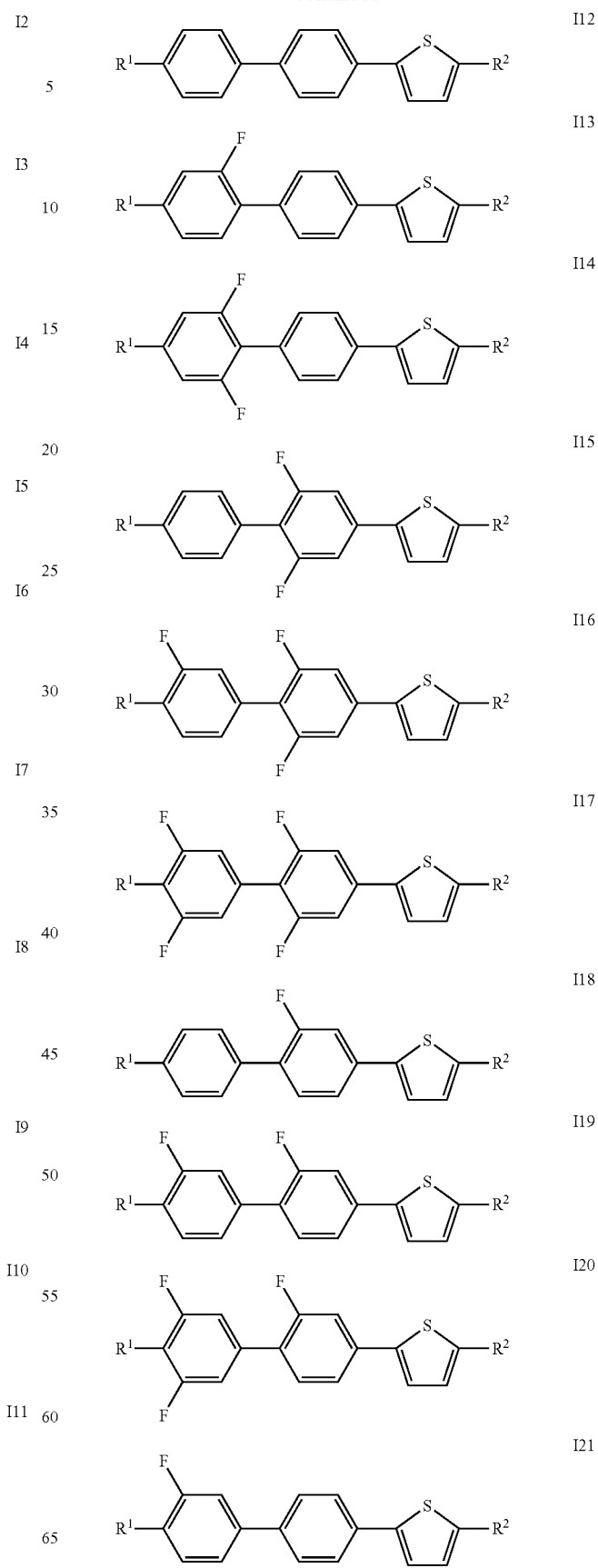

I22
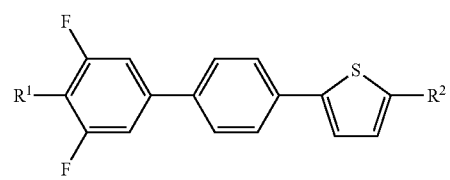
I23
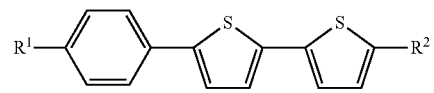
I24
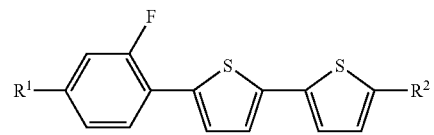
I25
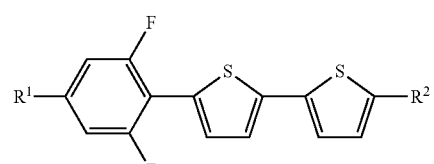
I26
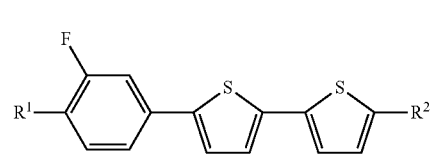
I27
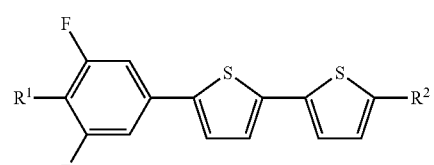
I28
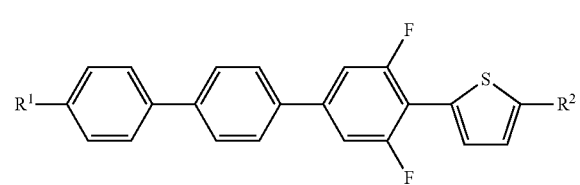
I29
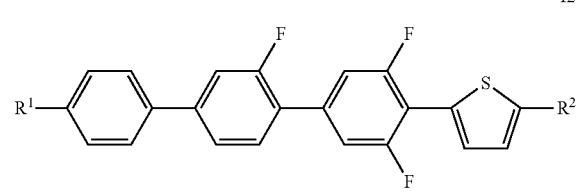
I30
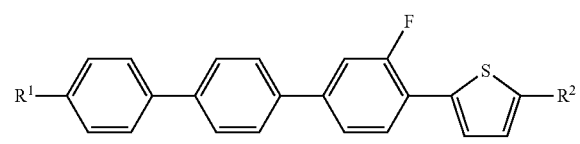
I31
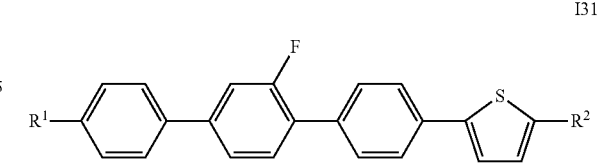
I32
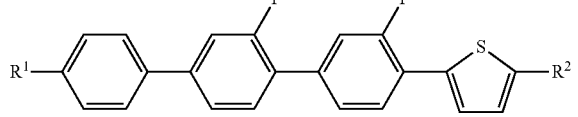
I33
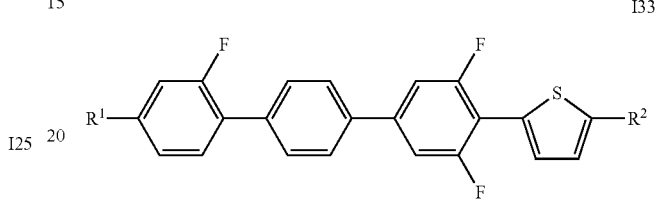
I34
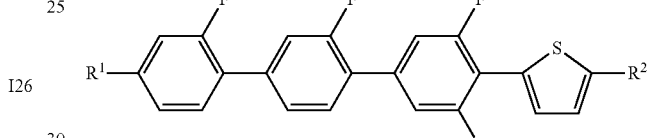
I35
I36
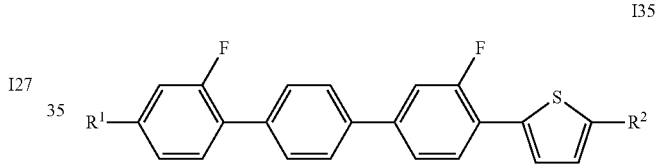
I37
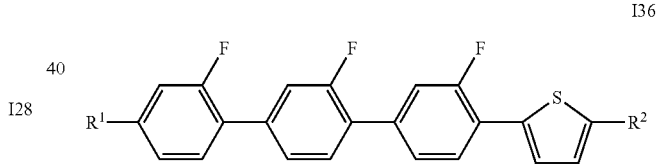
I38
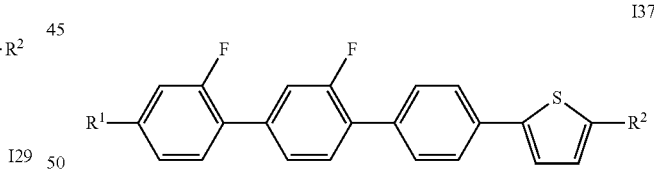
I39
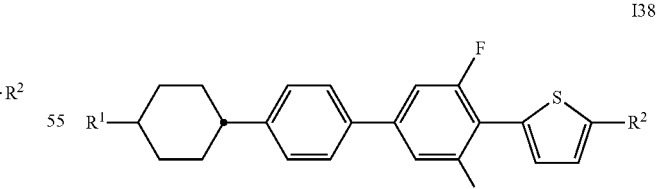
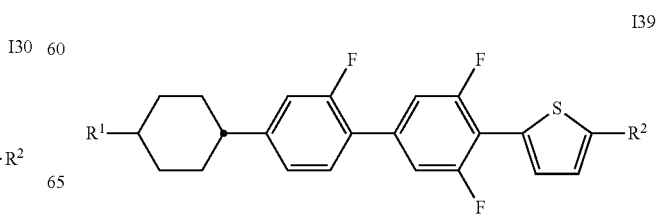

-continued

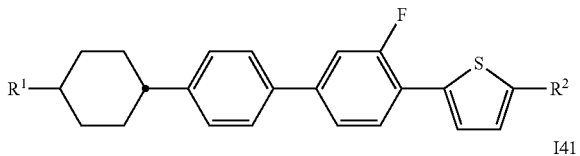
I40

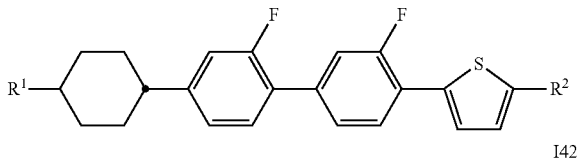
I41

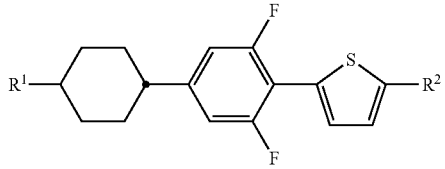
I42

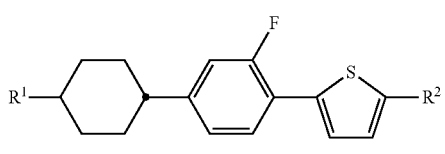
I43

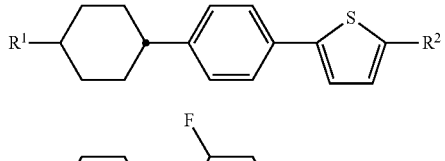
I44

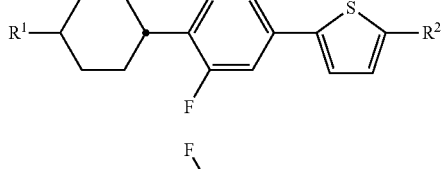
I45

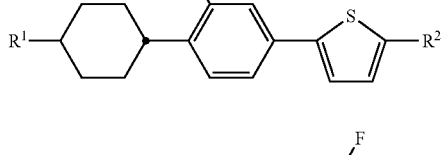
I46

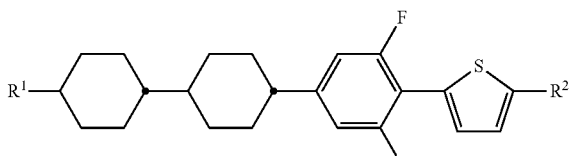
I47

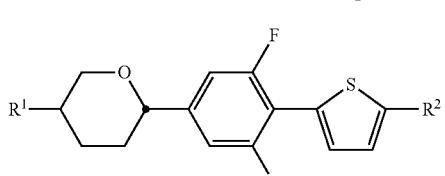
I48

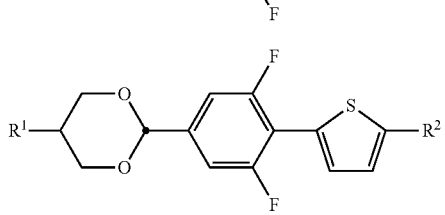
I49

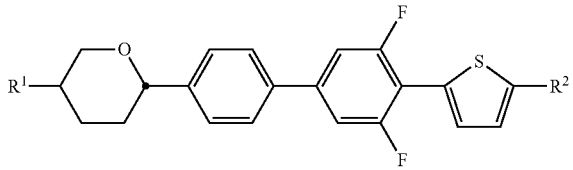
I50

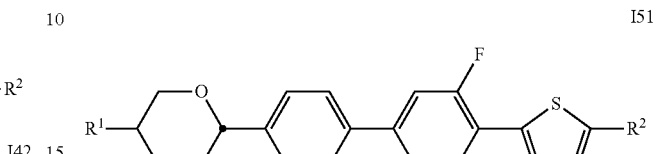
I51

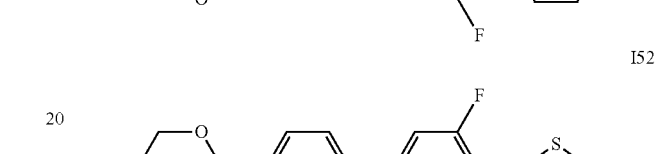
I52

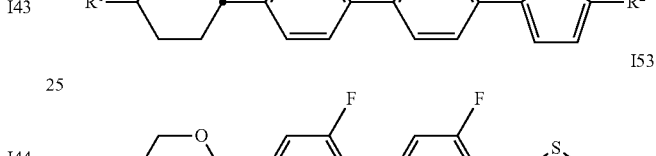
I53

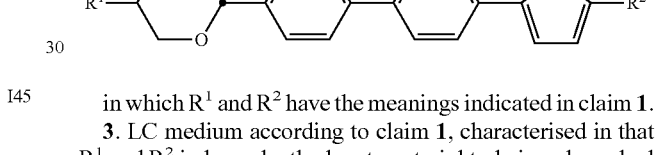

in which $R^1$ and $R^2$ have the meanings indicated in claim 1.

3. LC medium according to claim 1, characterised in that $R^1$ and $R^2$ independently denote a straight-chain or branched alkyl having 1 to 7 C atoms, in which, in addition, one or more non-adjacent CH$_2$ groups may each be replaced, independently of one another, by —CH=CH—, —C≡C—, —O—, —CO—, —CO—O—, —O—CO— or —O—CO—O— in such a way that O atoms are not linked directly to one another.

4. LC medium according to claim 1, characterised in that it has a nematic phase at room temperature.

5. LC medium according to claim 1, characterised in that it additionally comprises one or more compounds of the formulae II and/or III:

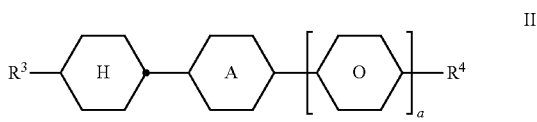
II

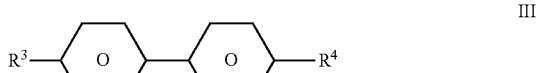
III in which
A denotes 1,4-phenylene or trans-1,4-cyclohexylene,
a is 0 or 1,
$R^3$ denotes alkyl or alkenyl having 1 to 8 or 2 to 9 C atoms respectively, and
$R^4$ denotes alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another.

6. LC medium according to claim 5, characterised in that it additionally comprises one or more compounds selected from the group consisting of the following formulae:

IV
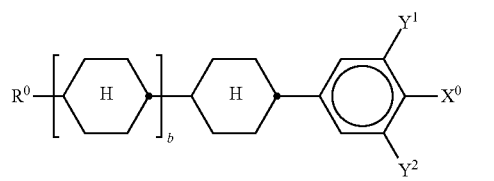

V
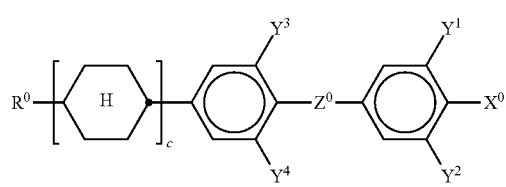

VI
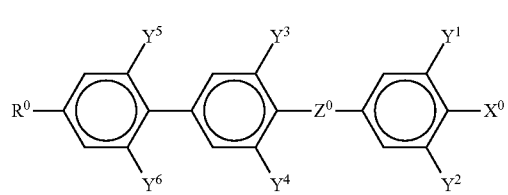

VII
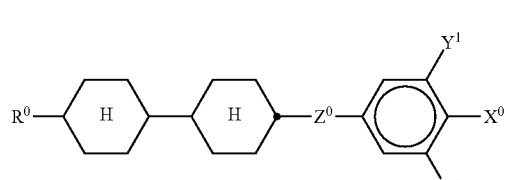

VIII
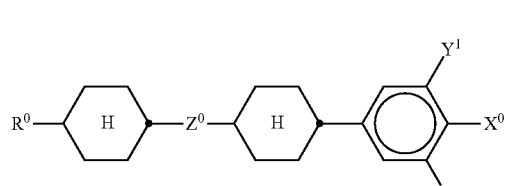

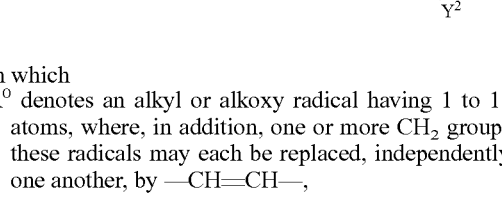

in which
$R^0$ denotes an alkyl or alkoxy radical having 1 to 15 C atoms, where, in addition, one or more CH$_2$ groups in these radicals may each be replaced, independently of one another, by —CH=CH—,

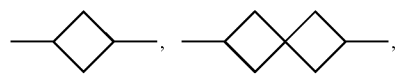

—O—, —CO—O— or —O—CO— in such a way that O atoms are not linked directly to one another, and in which, in addition, one or more H atoms may be replaced by halogen,
$X^0$ denotes F, Cl, CN, SF$_5$, SCN, NCS, a halogenated alkyl radical, halogenated alkenyl radical, halogenated alkoxy radical or halogenated alkenyloxy radical, each having up to 6 C atoms,
$Y^{1-6}$ each, independently of one another, denote H or F,
$Z^0$ denotes —C$_2$H$_4$—, —(CH$_2$)$_4$—, —CH=CH—, —CF=CF—, —CH$_2$CF$_2$—, —CF$_2$CH$_2$—, —CH$_2$O—, —OCH$_2$—, —COO—, —CF$_2$O— or —OCF$_2$—, in the formulae V and VI also a single bond, and
b and c each, independently of one another, denote 0 or 1.

7. LC medium according to claim 6, characterised in that it additionally comprises one or more compounds selected from the group consisting of the following formulae:

VI-2
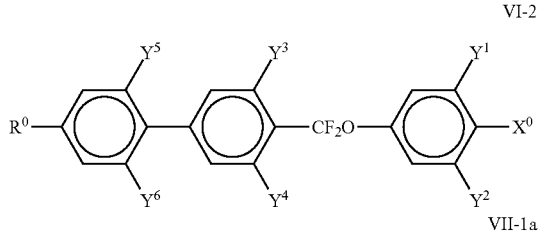

VII-1a
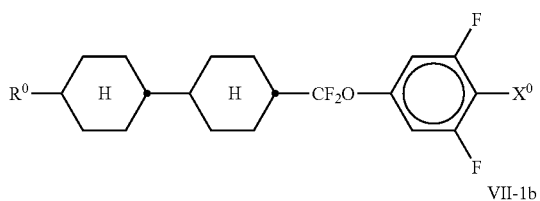

VII-1b
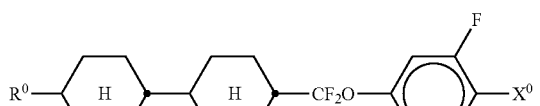

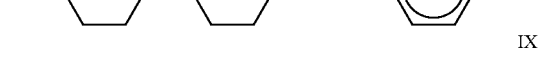

IX
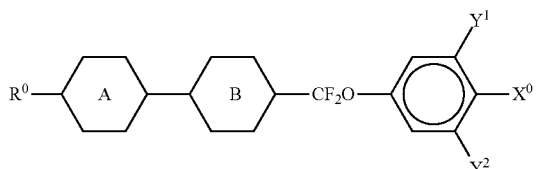

X
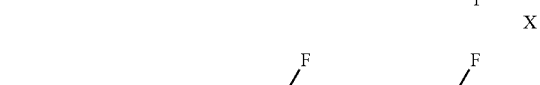

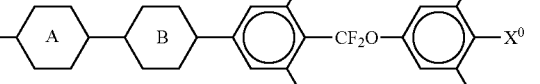

XI

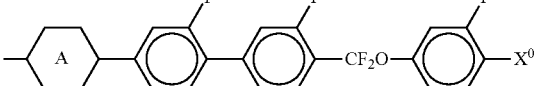

XXVI
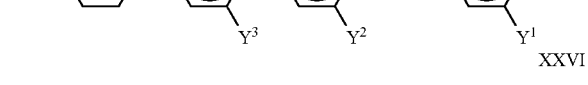

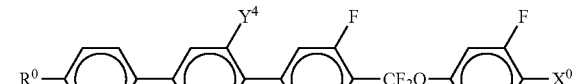

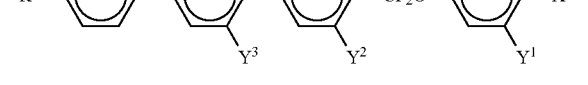

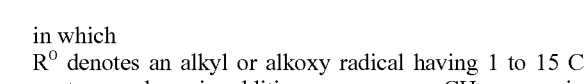

in which
$R^0$ denotes an alkyl or alkoxy radical having 1 to 15 C atoms, where, in addition, one or more CH$_2$ groups in these radicals may each be replaced, independently of one another, by —C≡C—, —CF$_2$O—, —CH=CH—,

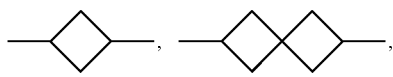

—O—, —CO—O— or —O—CO— in such a way that O atoms are not linked directly to one another, and in which, in addition, one or more H atoms may be replaced by halogen, $X^0$ denotes F, Cl, CN, $SF_5$, SCN, NCS, a halogenated alkyl radical, halogenated alkenyl radical, halogenated alkoxy radical or halogenated alkenyloxy radical, each having up to 6 C atoms, $Y^{1-6}$ each, independently of one another, denote H or F, and

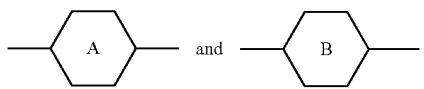

each, independently of one another, denote

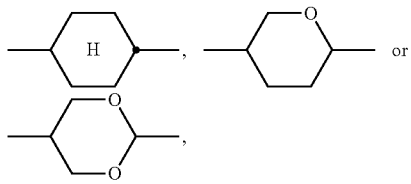

where the rings A and B in formula IX do not both simultaneously denote cyclohexylene.

8. LC medium according to claim 1, characterised in that it additionally comprises one or more compounds of the following formula:

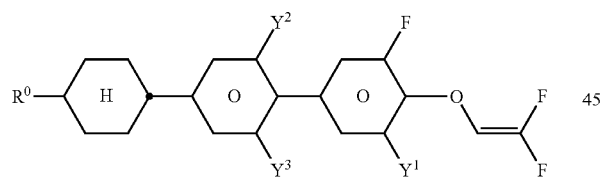

in which $R^0$ denotes an alkyl or alkoxy radical having 1 to 15 C atoms, where, in addition, one or more $CH_2$ groups in these radicals may each be replaced, independently of one another, by —C≡C—, —$CF_2O$—, —CH=CH—,

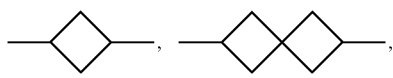

—O—, —CO—O— or —O—CO— in such a way that O atoms are not linked directly to one another, and in which, in addition, one or more H atoms may be replaced by halogen, and $Y^{1-3}$ each, independently of one another, denote H or F.

9. Process for the preparation of an LC medium according to claim 7, characterised in that one or more compounds of the formula I are mixed with one or more compounds of at least one of the formulae II-XI, XXVI or with further liquid-crystalline compounds and/or additives.

10. Electro-optical device containing an LC medium according to claim 1.

11. Device according to claim 10, characterised in that the device is a display device or a switchable lens.

12. LC medium according to claim 2, characterised in that it has a content of 25% by weight or more of one or more compounds selected from the formulae I1 to I53.

13. LC medium according to claim 1, characterised in that it additionally comprises one or more compounds selected from the group consisting of the following formulae:

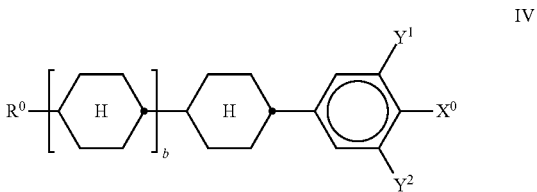

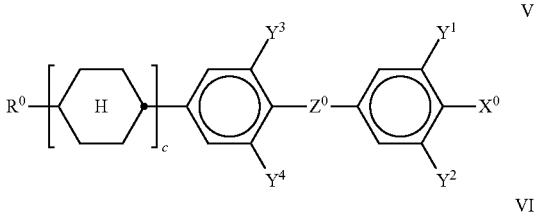

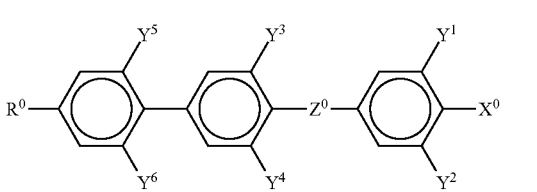

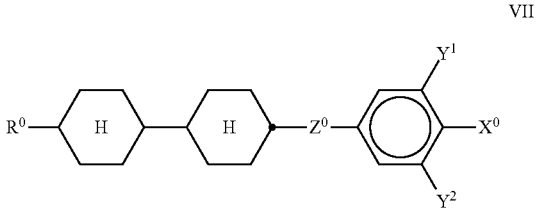

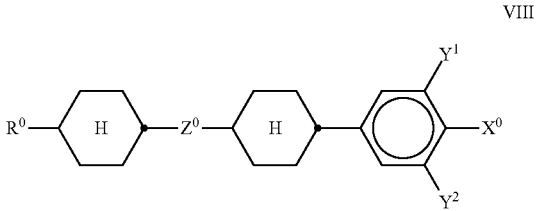

in which $R^0$ denotes an alkyl or alkoxy radical having 1 to 15 C atoms, where, in addition, one or more $CH_2$ groups in these radicals may each be replaced, independently of one another, by —C≡C—, —$CF_2O$—, —CH=CH—,

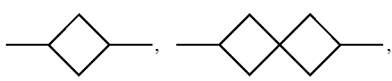

—O—, —CO—O— or —O—CO— in such a way that O atoms are not linked directly to one another, and in which, in addition, one or more H atoms may be replaced by halogen, X⁰ denotes F, Cl, CN, SF₅, SCN, NCS, a halogenated alkyl radical, halogenated alkenyl radical, halogenated alkoxy radical or halogenated alkenyloxy radical, each having up to 6 C atoms, $Y^{1-6}$ each, independently of one another, denote H or F, Z⁰ denotes —C₂H₄—, —(CH₂)₄—, —CH═CH—, —CF═CF—, —CH₂CF₂—, —CF₂CH₂—, —CH₂O—, —OCH₂—, —COO—, —CF₂O— or —OCF₂—, in the formulae V and VI also a single bond, and b and c each, independently of one another, denote 0 or 1.

14. LC medium according to claim 1, characterised in that it additionally comprises one or more compounds selected from the group consisting of the following formulae:

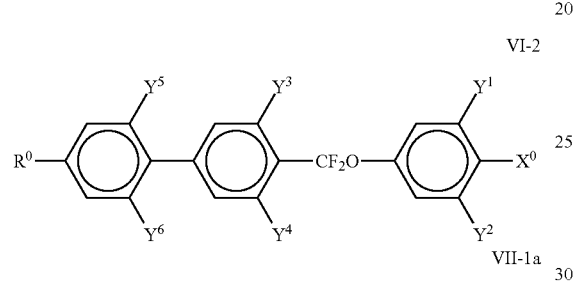

VI-2

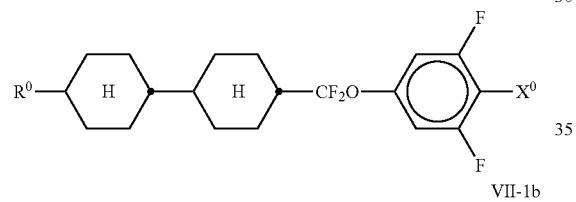

VII-1a

VII-1b

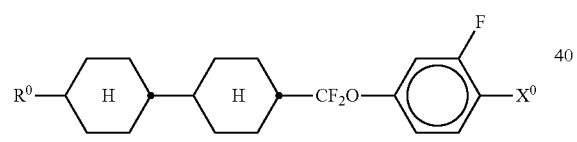

IX

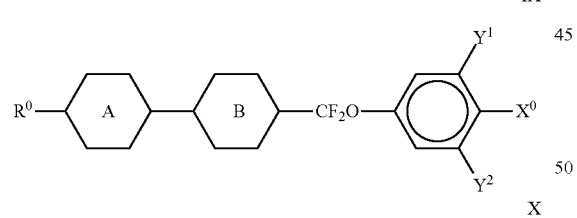

X

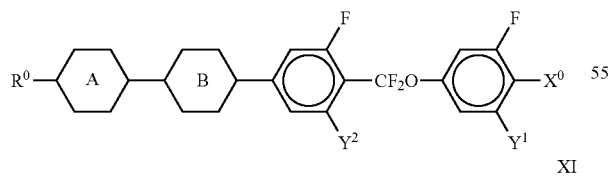

XI

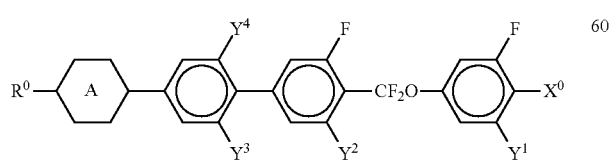

-continued

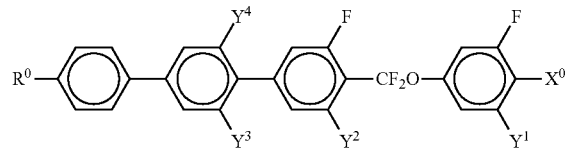

XXVI in which

R⁰ denotes an alkyl or alkoxy radical having 1 to 15 C atoms, where, in addition, one or more CH₂ groups in these radicals may each be replaced, independently of one another, by —C≡C—, —CF₂O—, —CH═CH—,

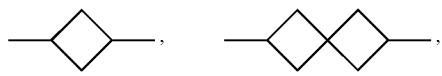

—O—, —CO—O— or —O—CO— in such a way that O atoms are not linked directly to one another, and in which, in addition, one or more H atoms may be replaced by halogen, X⁰ denotes F, Cl, CN, SF₅, SCN, NCS, a halogenated alkyl radical, halogenated alkenyl radical, halogenated alkoxy radical or halogenated alkenyloxy radical, each having up to 6 C atoms, $Y^{1-6}$ each, independently of one another, denote H or F, and

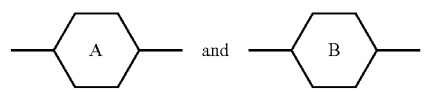

each, independently of one another, denote

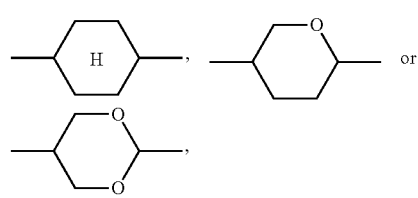

where the rings A and B in formula IX do not both simultaneously denote cyclohexylene.

15. An LC medium according to claim 1, wherein, in formula I:

A⁰ denotes

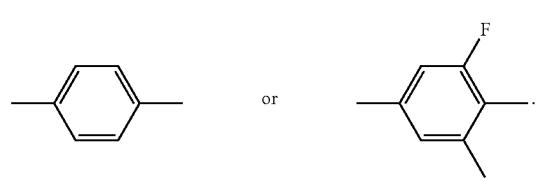

16. An LC medium according to claim 1, wherein the medium has a content of 30-80% by weight of the one or more compounds of the formula I.

* * * * *

UNITED STATES PATENT AND TRADEMARK OFFICE
CERTIFICATE OF CORRECTION

PATENT NO. : 8,906,261 B2
APPLICATION NO. : 13/812743
DATED : December 9, 2014
INVENTOR(S) : Michael Wittek et al.

It is certified that error appears in the above-identified patent and that said Letters Patent is hereby corrected as shown below:

IN THE CLAIMS:

Column 85, line 50 (Claim 6), reads: -- one another, by -CH =CH- , --
Should read: -- one another, by -C≡C-, -CF$_2$O-, -CH=CH-, --.

Column 85, line 67 (Claim 6), reads: -- -CF=CF-, -CH$_2$CF$_2$-, -CF$_2$CH$_2$-, -CH$_2$O-, --
Should read: -- -CF=CF-, -C$_2$F$_4$-, -CH$_2$CF$_2$-, -CF$_2$CH$_2$-, -CH$_2$O-, --.

Column 89, lines 9-10 (claim 13), read as follows:
-- $Y^{1-6}$ each, independently of one another, denote H or F, $Z^0$
   denotes -C$_2$H$_4$-, -(CH$_2$)$_4$-, -CH=CH-, --
Should read as follows:
-- $Y^{1-6}$ each, independently of one another, denote H or F,
   $Z^0$ denotes -C$_2$H$_4$-, -(CH$_2$)$_4$-, -CH=CH-, --.

Column 89, line 11 (Claim 13), reads: -- -CF=CF-, -CH$_2$CF$_2$-, -CF$_2$CH$_2$-, --
Should read: -- -CF=CF-, -C$_2$F$_4$-, -CH$_2$CF$_2$-, -CF$_2$CH$_2$-, --.

Column 90, lines 39-41 (Claim 14), reads as follows:

Should read:

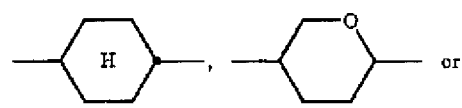

Signed and Sealed this
Twenty-seventh Day of October, 2015

Michelle K. Lee
*Director of the United States Patent and Trademark Office*

CERTIFICATE OF CORRECTION (continued)
U.S. Pat. No. 8,906,261 B2

IN THE CLAIMS:

Column 90, lines 56-59 (Claim 15), reads as follows:

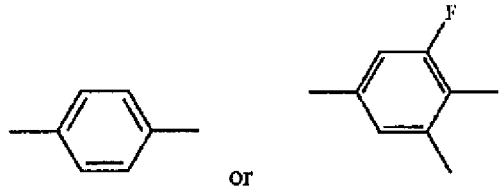

Should read: